(12) United States Patent
Yang et al.

(10) Patent No.: US 11,665,643 B2
(45) Date of Patent: May 30, 2023

(54) SIGNAL SENDING AND RECEIVING METHOD AND APPARATUS

(71) Applicant: ZTE Corporation, Shenzhen (CN)

(72) Inventors: Weiwei Yang, Shenzhen (CN); Bo Dai, Shenzhen (CN); Huiying Fang, Shenzhen (CN); Kun Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 181 days.

(21) Appl. No.: 17/054,555

(22) PCT Filed: May 10, 2019

(86) PCT No.: PCT/CN2019/086318
§ 371 (c)(1),
(2) Date: Nov. 11, 2020

(87) PCT Pub. No.: WO2019/214698
PCT Pub. Date: Nov. 14, 2019

(65) Prior Publication Data
US 2021/0274443 A1 Sep. 2, 2021

(30) Foreign Application Priority Data
May 11, 2018 (CN) .......................... 201810450743.7

(51) Int. Cl.
*H04W 52/02* (2009.01)
*H04J 13/00* (2011.01)
*H04J 13/10* (2011.01)

(52) U.S. Cl.
CPC ..... *H04W 52/0235* (2013.01); *H04J 13/0062* (2013.01); *H04J 13/10* (2013.01)

(58) Field of Classification Search
CPC .... H04J 13/0062; H04J 13/10; H04J 13/0022; H04J 13/004; H04J 13/102; H04J 13/14; Y02D 30/70; H04L 5/00; H04L 5/0048
See application file for complete search history.

(56) References Cited

U.S. PATENT DOCUMENTS

2013/0272263 A1* 10/2013 Pi ........................ H04L 25/0204
370/330
2015/0085793 A1* 3/2015 Luo ...................... H04L 25/0224
370/329

(Continued)

FOREIGN PATENT DOCUMENTS

| CN | 103096389 A | 5/2013 |
| CN | 106961408 A | 7/2017 |

(Continued)

OTHER PUBLICATIONS

International Search Report for corresponding application PCT/CN2019/086318 filed on May 10, 2019; dated Aug. 1, 2019.

*Primary Examiner* — Mohammad S Adhami
*Assistant Examiner* — Vladislav Y Agureyev
(74) *Attorney, Agent, or Firm* — Cantor Colburn LLP

(57) ABSTRACT

A signal sending and receiving method and apparatus are provided. A first signal is sent, and a sequence of the first signal is generated at least based on a first sequence and a second sequence. There are multiple manners for determining the first sequence and the second sequence. For example, the first sequence is determined at least according to start time domain location information of the first signal and current time domain location information of the first signal, and the second sequence is determined at least according to a cell index corresponding to the first signal.

20 Claims, 3 Drawing Sheets

Send a first signal, wherein a sequence of the first signal is generated at least based on a first sequence and a second sequence, and the first sequence and the second sequence are determined in one of the following manners: in a first manner, the first sequence is determined at least according to start time domain location information of the first signal and current time domain location information of the first signal, and the second sequence is determined at least according to a cell index corresponding to the first signal; in a second manner, the first sequence is determined at least according to the start time domain location information of the first signal, and the second sequence is determined at least according to the cell index corresponding to the first signal and the current time domain location information of the first signal; in a third manner, the first sequence is determined at least according to the start time domain location information of the first signal, the current time domain location information of the first signal, and the cell index corresponding to the first signal, and the second sequence is determined at least according to the cell index corresponding to the first signal; in a fourth manner, the first sequence is determined at least according to the start time domain location information of the first signal and the cell index corresponding to the first signal, and the second sequence is determined at least according to the cell index corresponding to the first signal and the current time domain location information of the first signal; in a fifth manner, the first sequence and the second sequence are determined at least according to the cell index corresponding to the first signal — S102

(56) References Cited

U.S. PATENT DOCUMENTS

| | | |
|---|---|---|
| 2015/0296518 A1 | 10/2015 | Yi |
| 2017/0164308 A1* | 6/2017 | Ji .......................... H04J 11/0069 |
| 2018/0212728 A1* | 7/2018 | Wang .................... H04W 72/14 |
| 2018/0248680 A1* | 8/2018 | Ji .......................... H04J 13/0062 |
| 2018/0270807 A1* | 9/2018 | Salem .................... H04L 5/0055 |
| 2018/0309533 A1* | 10/2018 | Yoshimoto ......... H04L 27/26025 |
| 2019/0140689 A1* | 5/2019 | Wang ................ H04W 72/0466 |
| 2019/0140799 A1* | 5/2019 | Gao ...................... H04L 5/0064 |
| 2019/0159128 A1* | 5/2019 | Lin .......................... H04W 4/70 |
| 2019/0166569 A1* | 5/2019 | Wu ...................... H04J 11/0069 |
| 2019/0174492 A1* | 6/2019 | Gao .................. H04W 72/0446 |
| 2019/0245663 A1* | 8/2019 | Kim ...................... H04L 5/0091 |
| 2019/0260502 A1* | 8/2019 | Ma ........................ H04L 1/0042 |
| 2019/0327756 A1* | 10/2019 | Guan ................ H04W 72/1284 |
| 2020/0015276 A1* | 1/2020 | Reial .................... H04L 5/0053 |
| 2020/0029302 A1* | 1/2020 | Cox ...................... H04W 68/02 |
| 2020/0036564 A1* | 1/2020 | Murakami ............. H04L 1/1671 |
| 2020/0052939 A1* | 2/2020 | Xiong .................... H04L 5/0051 |
| 2020/0328776 A1* | 10/2020 | Scholand ............... H04B 1/715 |
| 2021/0235418 A1* | 7/2021 | Ko .......................... H04L 25/03 |
| 2021/0368495 A1* | 11/2021 | Matsumura ....... H04W 72/0453 |

FOREIGN PATENT DOCUMENTS

| | | | | |
|---|---|---|---|---|
| EP | 3063880 B1 * | 9/2018 | ........... | H04B 1/7073 |
| EP | 3133881 B1 * | 3/2019 | ........... | H04L 27/261 |
| WO | 2017057986 A1 | 4/2017 | | |

\* cited by examiner

Send a first signal, wherein a sequence of the first signal is generated at least based on a first sequence and a second sequence, and the first sequence and the second sequence are determined in one of the following manners: in a first manner, the first sequence is determined at least according to start time domain location information of the first signal and current time domain location information of the first signal, and the second sequence is determined at least according to a cell index corresponding to the first signal; in a second manner, the first sequence is determined at least according to the start time domain location information of the first signal, and the second sequence is determined at least according to the cell index corresponding to the first signal and the current time domain location information of the first signal; in a third manner, the first sequence is determined at least according to the start time domain location information of the first signal, the current time domain location information of the first signal, and the cell index corresponding to the first signal, and the second sequence is determined at least according to the cell index corresponding to the first signal; in a fourth manner, the first sequence is determined at least according to the start time domain location information of the first signal and the cell index corresponding to the first signal, and the second sequence is determined at least according to the cell index corresponding to the first signal and the current time domain location information of the first signal; in a fifth manner, the first sequence and the second sequence are determined at least according to the cell index corresponding to the first signal — S102

Fig. 1

Receive a first signal sent by a base station, wherein a sequence of the first signal is generated at least based on the first sequence and the second sequence, and the first sequence and the second sequence are determined in one of the following manners: in a first manner, the first sequence is determined at least according to the start time domain location information of the first signal and the current time domain location information of the first signal, and the second sequence is determined at least according to the cell index corresponding to the first signal; in a second manner, the first sequence is determined at least according to the start time domain location information of the first signal, and the second sequence is determined at least according to the cell index corresponding to the first signal and the current time domain location information of the first signal; in a third manner, the first sequence is determined at least according to the start time domain location information of the first signal, the current time domain location information of the first signal, and the cell index corresponding to the first signal, and the second sequence is determined at least according to the cell index corresponding to the first signal; in a fourth manner, the first sequence is determined at least according to the start time domain location information of the first signal and the cell index corresponding to the first signal, and the second sequence is determined at least according to the cell index corresponding to the first signal and the current time domain location information of the first signal; in a fifth manner, the first sequence and the second sequence are determined at least according to the cell index corresponding to the first signal — S202

Fig. 2

SIGNAL SENDING AND RECEIVING METHOD AND APPARATUS

CROSS-REFERENCE TO RELATED APPLICATIONS

The present application claims priority to Chinese Patent Application No. 201810450743.7, filed to the China National Intellectual Property Administration (CNIPA) on May 11, 2018, the disclosure of which is hereby incorporated by reference in its entirety.

TECHNICAL FIELD

The disclosure relates to the field of communications, for example, to a signal sending and receiving method and apparatus.

BACKGROUND

Machine Type Communications (MTC), also known as Machine to Machine (M2M) communication, is the main application form of the Internet of Things (IoT) at the present stage. At present, MTC equipment deployed in the market is mainly based on the Global System of Mobile Communication (GSM). In recent years, due to the high spectrum efficiency of Long Term Evolution (LTE)/LTE-Advanced (LTE-A), more and more mobile telecommunication operators choose the LTE/LTE-A as the evolution direction of broadband wireless communication system in the future. Multiple types of data services of MTC based on the LTE/LTE-A will also be more attractive.

Several technologies applicable to Cellular-Internet of Things (C-IoT) are provided in the technical report TR45.820V200 of the 3rd Generation Partnership Project (3GPP), among which a Narrow Band-Internet of Things (NB-IoT) technology is the most eye-catching technology. A NB-IoT system focuses on a radio frequency access technology with low complexity and low throughput, and the main research objectives of the NB-IoT include improved indoor coverage, support for a large number of low throughput user devices, low delay sensitivity, ultra-low cost of device, low power loss of device, and network architecture.

A network may send a paging request to User Equipment (UE) in RRC-idle state and RRC-connected state. A paging process may be triggered by a core network to notify certain UEs to receive a paging request. The paging process may alternatively be triggered by an eNB to notify the update of system information. A paging message is scheduled by a Physical Downlink Control Channel (PDCCH) scrambled using P-Radio Network Temporary Identifier (RNTI), and is transmitted through a Physical Downlink Shared Channel (PDSCH). The UE checks the corresponding PDCCH on a Paging Occasion (PO) to determine whether the PDSCH indicated by the PDCCH carries the paging message. If the UE does not detect the corresponding PDCCH on the PO, which means that there is no paging message on the PO, the terminal enters a sleep state and does not receive data until the next PO, and this mechanism is called Discontinuous Reception (DRX). In the DRX procedure, the UE needs to conduct blind detection of the PDCCH on each PO. For this reason, it is considered to introduce a wake-up signal to further reduce power consumption, that is, the UE conducts the blind detection of the PDCCH only when detecting the corresponding wake-up signal/channel.

In addition to the wake-up signal, a new synchronization signal is also introduced to the MTC system, so as to reduce the time required for the UE to access the system, thus reducing the power consumption of the UE. However, there is no specific method provided for the generation of a sequence corresponding to the newly introduced signal.

SUMMARY

Embodiments of the disclosure provide a signal sending and receiving method and apparatus to solve the problem in the related technology that a specific method for generating a sequence corresponding to a newly introduced signal has not been proposed.

According to an embodiment of the disclosure, a signal sending method is provided, which includes an operation of sending a first signal. A sequence of the first signal is generated at least based on a first sequence and a second sequence. The first sequence and the second sequence are determined in one of the following manners. In a first manner, the first sequence is determined at least according to start time domain location information of the first signal and current time domain location information of the first signal, and the second sequence is determined at least according to a cell index corresponding to the first signal. In a second manner, the first sequence is determined at least according to the start time domain location information of the first signal, and the second sequence is determined at least according to the cell index corresponding to the first signal and the current time domain location information of the first signal. In a third manner, the first sequence is determined at least according to the start time domain location information of the first signal, the current time domain location information of the first signal, and the cell index corresponding to the first signal, and the second sequence is determined at least according to the cell index corresponding to the first signal. In a fourth manner, the first sequence is determined at least according to the start time domain location information of the first signal and the cell index corresponding to the first signal, and the second sequence is determined at least according to the cell index corresponding to the first signal and the current time domain location information of the first signal. In a fifth manner, the first sequence and the second sequence are determined at least according to the cell index corresponding to the first signal.

According to another embodiment of the disclosure, a signal receiving method is provided, which includes an operation of receiving a first signal sent by a base station. The sequence of the first signal is generated at least based on a first sequence and a second sequence. The first sequence and the second sequence are determined in one of the following manners. In a first manner, the first sequence is determined at least according to start time domain location information of the first signal and current time domain location information of the first signal, and the second sequence is determined at least according to a cell index corresponding to the first signal. In a second manner, the first sequence is determined at least according to the start time domain location information of the first signal, and the second sequence is determined at least according to the cell index corresponding to the first signal and the current time domain location information of the first signal. In a third manner, the first sequence is determined at least according to the start time domain location information of the first signal, the current time domain location information of the first signal, and the cell index corresponding to the first signal, and the second sequence is determined at least according to the cell index corresponding to the first signal. In a fourth manner, the first sequence is determined at least according to the start time domain location information of the first signal and the cell index corresponding to the first signal, and the second sequence is determined at least according to the cell index corresponding to the first signal and the current time domain location information of the first signal. In a fifth manner, the first sequence and the second sequence are determined at least according to the cell index corresponding to the first signal.

According to another embodiment of the disclosure, a signal sending apparatus is provided, which is applied to the base station and includes a sending module configured to send a first signal. A sequence of the first signal is generated at least based on a first sequence and a second sequence. The first sequence and the second sequence are determined in one of the following manners. In a first manner, the first sequence is determined at least according to start time domain location information of the first signal and current time domain location information of the first signal, and the second sequence is determined at least according to a cell index corresponding to the first signal. In a second manner, the first sequence is determined at least according to the start time domain location information of the first signal, and the second sequence is determined at least according to the cell index corresponding to the first signal and the current time domain location information of the first signal. In a third manner, the first sequence is determined at least according to the start time domain location information of the first signal, the current time domain location information of the first signal, and the cell index corresponding to the first signal, and the second sequence is determined at least according to the cell index corresponding to the first signal. In a fourth manner, the first sequence is determined at least according to the start time domain location information of the first signal and the cell index corresponding to the first signal, and the second sequence is determined at least according to the cell index corresponding to the first signal and the current time domain location information of the first signal. In a fifth manner, the first sequence and the second sequence are determined at least according to the cell index corresponding to the first signal.

According to another embodiment of the disclosure, a signal receiving apparatus is provided, which is applied to UE and includes a receiving module configured to receive a first signal sent by a base station. A sequence of the first signal is generated at least based on a first sequence and a second sequence. The first sequence and the second sequence are determined in one of the following manners. In a first manner, the first sequence is determined at least according to start time domain location information of the first signal and current time domain location information of the first signal, and the second sequence is determined at least according to a cell index corresponding to the first signal. In a second manner, the first sequence is determined at least according to the start time domain location information of the first signal, and the second sequence is determined at least according to the cell index corresponding to the first signal and the current time domain location information of the first signal. In a third manner, the first sequence is determined at least according to the start time domain location information of the first signal, the current time domain location information of the first signal, and the cell index corresponding to the first signal, and the second sequence is determined at least according to the cell index corresponding to the first signal. In a fourth manner, the first sequence is determined at least according to the start time domain location information of the first signal and the cell index corresponding to the first signal, and the second sequence is determined at least according to the cell index corresponding to the first signal and the current time domain location information of the first signal. In a fifth manner, the first sequence and the second sequence are determined at least according to the cell index corresponding to the first signal.

According to yet another embodiment of the disclosure, a storage medium is also provided. The storage medium stores a computer program. The computer program is configured to execute, when running, operations in any of the above method embodiments.

According to yet another embodiment of the disclosure, an electronic device is also provided, which includes a memory and a processor. The memory stores a computer program. The processor is configured to run the computer program to execute operations in any of the above method embodiments.

Through the solutions provided in the embodiments of the disclosure, the first signal is sent. A sequence of the first signal is generated at least based on a first sequence and a second sequence. The first sequence and the second sequence are determined in one of the following manners. In a first manner, the first sequence is determined at least according to start time domain location information of the first signal and current time domain location information of the first signal, and the second sequence is determined at least according to a cell index corresponding to the first signal. In a second manner, the first sequence is determined at least according to the start time domain location information of the first signal, and the second sequence is determined at least according to the cell index corresponding to the first signal and the current time domain location information of the first signal. In a third manner, the first sequence is determined at least according to the start time domain location information of the first signal, the current time domain location information of the first signal, and the cell index corresponding to the first signal, and the second sequence is determined at least according to the cell index corresponding to the first signal. In a fourth manner, the first sequence is determined at least according to the start time domain location information of the first signal and the cell index corresponding to the first signal, and the second sequence is determined at least according to the cell index corresponding to the first signal and the current time domain location information of the first signal. In a fifth manner, the first sequence and the second sequence are determined at least according to the cell index corresponding to the first signal. That is, by determining the first sequence and the second sequence in any of the above manners, the problem in the related technology that a specific method for generating a sequence corresponding to a newly introduced signal has not been proposed is solved, and the technical effect of effectively sending signals is achieved.

BRIEF DESCRIPTION OF THE DRAWINGS

The accompanying drawings described here are used for providing deeper understanding of the disclosure, and constitute a part of the present application. Schematic embodiments of the disclosure and description thereof are used for illustrating the disclosure and not intended to form an improper limit to the disclosure. In the accompanying drawings:

FIG. 1 is a flowchart of a signal sending method according to an embodiment of the disclosure;

FIG. 2 is a flowchart of a signal receiving method according to an embodiment of the disclosure;

DETAILED DESCRIPTION OF THE EMBODIMENTS

Figure 3:
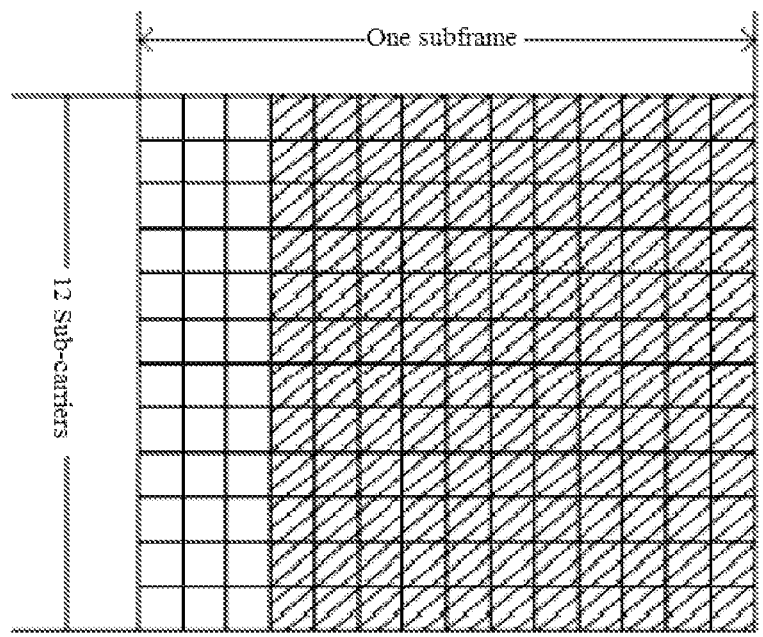
FIG. 3 is a first schematic diagram of a signal sending method according to an optional embodiment of the disclosure.

The disclosure is elaborated below with reference to the accompanying drawings and embodiments. It is to be noted that the embodiments in the application and characteristics in the embodiments may be combined without conflicts.

It is to be noted that the terms like "first" and "second" in the specification, claims and accompanying drawings of the disclosure are used for differentiating the similar objects, but do not have to describe a specific order or a sequence.

Embodiment 1

In the present embodiment, a signal sending method is provided. FIG. 1 is a flowchart of the signal sending method according to the embodiment of the disclosure. As shown in FIG. 1, the flow includes the following operation.

In operation S102, a first signal is sent. A sequence of the first signal is generated at least based on a first sequence and a second sequence. The first sequence and the second sequence are determined in one of the following manners. In a first manner, the first sequence is determined at least according to start time domain location information of the first signal and current time domain location information of the first signal, and the second sequence is determined at least according to a cell index corresponding to the first signal. In a second manner, the first sequence is determined at least according to the start time domain location information of the first signal, and the second sequence is determined at least according to the cell index corresponding to the first signal and the current time domain location information of the first signal. In a third manner, the first sequence is determined at least according to the start time domain location information of the first signal, the current time domain location information of the first signal, and the cell index corresponding to the first signal, and the second sequence is determined at least according to the cell index corresponding to the first signal. In a fourth manner, the first sequence is determined at least according to the start time domain location information of the first signal and the cell index corresponding to the first signal, and the second sequence is determined at least according to the cell index corresponding to the first signal and the current time domain location information of the first signal. In a fifth manner, the first sequence and the second sequence are determined at least according to the cell index corresponding to the first signal.

In an exemplary implementation of the embodiment, the executer of the above operation may be, but is not limited to be, a base station.

In an exemplary implementation of the embodiment, the first sequence is a pseudo-random sequence, and the second sequence is a Zadoff-Chu (ZC) sequence; or, the first sequence is a Hadamard sequence, and the second sequence is a ZC sequence. When the first sequence is the pseudo-random sequence and the second sequence is the ZC sequence, an initial value of the pseudo-random sequence is determined in the manner of determining the first sequence, and a root sequence index and/or a cyclic shift index corresponding to the ZC sequence are/is determined in the manner of determining the second sequence. When the first sequence is the Hadamard sequence and the second sequence is the ZC sequence, that the first sequence and the second sequence are determined at least according to the cell index corresponding to the first signal includes that: a sequence index of the first sequence and a root sequence index of the second sequence are determined according to the cell index corresponding to the first signal.

In an exemplary implementation of the embodiment, the start time domain location information of the first signal includes at least one of the following: a start radio frame index, a start subframe index, a start radio frame index of a first channel search space corresponding to the first signal, and a start subframe index of the first channel search space corresponding to the first signal.

In an exemplary implementation of the embodiment, the current time domain location information of the first signal includes at least one of the following: a current radio frame index, a current subframe index, a first offset value of a current subframe relative to a start subframe of the first signal, a second offset value of a current radio frame relative to a start radio frame of the first signal, a third offset value of the current subframe relative to the start radio frame of the first signal, and a fourth offset value of the current radio frame relative to the start subframe of the first signal.

In an exemplary implementation of the embodiment, the first signal includes at least one of a synchronization signal and a wake-up signal. When the first signal is a synchronization signal, the sequence of the first signal is generated further based on a third sequence. The third sequence is an orthogonal sequence with a length F, or the third sequence is generated based on a fourth sequence with a length G, where F is a total number of subframes corresponding to the first signal, and G is a positive integer less than or equal to F.

By determining the first sequence and the second sequence in the above operation S102, the problem in the related technology that a specific method for generating a sequence corresponding to a newly introduced signal has not been proposed is solved, and the technical effect of effectively sending signals is achieved.

In the present embodiment, a signal receiving method is also provided. FIG. 2 is a flowchart of the signal receiving method according to the embodiment of the disclosure. As shown in FIG. 2, the flow includes the following operations.

In operation S202, a first signal sent by a base station is received. A sequence of the first signal is generated at least based on a first sequence and a second sequence. The first sequence and the second sequence are determined in one of the following manners. In a first manner, the first sequence is determined at least according to start time domain location information of the first signal and current time domain location information of the first signal, and the second sequence is determined at least according to a cell index corresponding to the first signal. In a second manner, the first sequence is determined at least according to the start time domain location information of the first signal, and the second sequence is determined at least according to the cell index corresponding to the first signal and the current time domain location information of the first signal. In a third manner, the first sequence is determined at least according to the start time domain location information of the first signal, the current time domain location information of the first signal, and the cell index corresponding to the first signal, and the second sequence is determined at least according to the cell index corresponding to the first signal. In a fourth manner, the first sequence is determined at least according to the start time domain location information of the first signal and the cell index corresponding to the first signal, and the second sequence is determined at least according to the cell index corresponding to the first signal and the current time domain location information of the first signal. In a fifth manner, the first sequence and the second sequence are determined at least according to the cell index corresponding to the first signal.

In an exemplary implementation of the embodiment, the executer of the above operation may be, but is not limited to be, user equipment (UE).

In an exemplary implementation of the embodiment, the first sequence is a pseudo-random sequence, and the second sequence is a ZC sequence; or, the first sequence is a Hadamard sequence, and the second sequence is a ZC sequence. When the first sequence is the pseudo-random sequence and the second sequence is the ZC sequence, an initial value of the pseudo-random sequence is determined in the manner of determining the first sequence, and a root sequence index and/or a cyclic shift index corresponding to the ZC sequence are/is determined in the manner of determining the second sequence. When the first sequence is the Hadamard sequence and the second sequence is the ZC sequence, the operation that the first sequence and the second sequence are determined at least according to the cell index corresponding to the first signal includes that: a sequence index of the first sequence and a root sequence index of the second sequence are determined according to the cell index corresponding to the first signal.

In an exemplary implementation of the embodiment, the start time domain location information of the first signal includes at least one of the following: a start radio frame index, a start subframe index, a start radio frame index of a first channel search space corresponding to the first signal, and a start subframe index of the first channel search space corresponding to the first signal.

In an exemplary implementation of the embodiment, the current time domain location information of the first signal includes at least one of the following: a current radio frame index, a current subframe index, a first offset value of a current subframe relative to a start subframe of the first signal, a second offset value of a current radio frame relative to a start radio frame of the first signal, a third offset value of the current subframe relative to the start radio frame of the first signal, and a fourth offset value of the current radio frame relative to the start subframe of the first signal.

In an exemplary implementation of the embodiment, the first signal includes at least one of the synchronization signal and the wake-up signal. When the first signal is a synchronization signal, the sequence of the first signal is generated further based on a third sequence. The third sequence is an orthogonal sequence with a length F, or the third sequence is generated based on a fourth sequence with a length G, where F is a total number of subframes corresponding to the first signal, and G is a positive integer less than or equal to F.

By determining the first sequence and the second sequence in the above operation S202, the problem in the related technology that a specific method for generating a sequence corresponding to a newly introduced signal has not been proposed is solved, and the technical effect of effectively sending signals is achieved.

The present embodiment is illustrated below in combination with optional embodiments, and specific embodiments and examples in the optional embodiments.

Optional Embodiment 1

It is assumed that a base station sends a first signal, wherein a sequence corresponding to the first signal consists of a first sequence and a second sequence, and the first sequence and the second sequence are determined in the first manner. The first sequence is a pseudo-random sequence or generated based on a pseudo-random sequence, and is preferably a Gold sequence. The second sequence is a ZC sequence, specifically:

$d(n)=c(m)*e^{-j2\pi\theta n}*e^{-j\pi un'(n'+1)/N_{zc}}$, where n'=mod(n, $N_{ZC}$), m=mod(n, $N_{PN}$), $N_{ZC}$ is the length of the second sequence, $N_{PN}$ is the length of the first sequence, the value of $N_{PN}$ is preset, $\theta$ is a cyclic shift corresponding to the second sequence, and u is a root sequence index corresponding to the second sequence. It is assumed that the position of the first signal mapped in the subframe is shown in FIG. 3, then n=0, 1, . . . , 131, the value of $N_{ZC}$ is a prime number less than 132, taking $N_{ZC}$=131 as an example.

Specific Embodiment 1

It is assumed that the cell index corresponding to the first signal is $N_{ID}^{Cell}$, then u corresponding to the second sequence satisfies u=mod($N_{ID}^{Cell}$,$Thr_1$)+$Thr_2$, and $$\theta = \frac{T}{132} * \left\lfloor \frac{N_{ID}^{Cell}}{Thr_1} \right\rfloor,$$

where the values of T, Thr1 and Thr2 are preset, for example, Thr1=126, Thr2=3, and T=33. Alternatively, it is assumed that the cell index corresponding to the first signal is $N_{ID}^{Cell}$, then u corresponding to the second sequence satisfies u=mod($N_{ID}^{Cell}$, $N_{ZC}$), and $\theta$=0.

It is assumed that the first sequence is a pseudo-random sequence, specifically $c(t)=\text{mod}(x_1(t+N_c)+x_2(t+N_c),2)$, where $x_1(t+31)=\text{mod}(x_1(t+3)+x_1(t),2)$ $x_2(t+31)=\text{mod}(x_2(t+3)+x_2(t+2)+x_2(t+1)+x_2(t),2)$, where t=0, 1, 2, . . . , $N_{PN}$−1, and Nc equals to a preset value. Herein, determining the first sequence at least according to the start time domain location information of the first signal and the current time domain location information of the first signal refers to determining the initial value $c_{init}$ of the second m-sequence that constitutes the Gold sequence.

Example 1

It is assumed that the start time domain location of the first signal is the start radio frame index $n_f^{init}$ of the first signal, and the current time domain location of the first signal is the current radio frame index $n_f$, then $c_{init}=n_f*2^{10}+n_f^{init}$, or $c_{init}=n_f^{init}*2^{10}+n_f$, or $c_{init}=n_f^{init}*n_f$ or $c_{init}=n_f-n_f^{init}$, or $c_{init}=n_f \bmod 2^{10}+n_f^{init}$, or $c_{init} = n_f^{init} \bmod 2*2^1 + n_f \bmod 2$, or $c_{init} = n_f^{init} \bmod 2 + n_f \bmod 2*2^1$, or $c_{init} = n_f^{init} \bmod q_1 + n_f \bmod q_2*2^w$, where $q_1$, $q_2$ are preset values, the value of $w$ is determined at least according to $q_1$.

Example 2

It is assumed that the start time domain location of the first signal is the start radio frame index $n_f^{init}$ of the first signal, and the current time domain location of the first signal is the current subframe index $\lfloor n_s/2 \rfloor$, where $n_s$ is a time slot index, then $c_{init} = n_f*2^4 + \lfloor n_s/2 \rfloor$, or $c_{init} = n_f * \lfloor n_s^{init}/2 \rfloor$, or $c_{init} = n_f \bmod q_1*2^4 + \lfloor n_s^{init}/2 \rfloor$, where $q_1$ is a preset value.

Example 3

It is assumed that the start time domain location of the first signal is the start subframe index $\lfloor n_s^{init}/2 \rfloor$ of the first signal, and the current time domain location of the first signal is the current radio frame index $n_f$, where $n_s$ is a time slot index, then $c_{init} = n_f*2^4 + \lfloor n_s^{init}/2 \rfloor$, or $c_{init} = n_f * \lfloor n_s^{init}/2 \rfloor$, or $c_{init} = n_f \bmod q_1*2^4 + \lfloor n_s^{init}/2 \rfloor$, where $q_1$ is a preset value.

Example 4

It is assumed that the start time domain location of the first signal is the start subframe index $\lfloor n_s^{init}/2 \rfloor$ of the first signal, and the current time domain location of the first signal is the current subframe index $\lfloor n_s/2 \rfloor$, where $n_s$ is a time slot index, then $c_{init} = \lfloor n_s^{init}/2 \rfloor * 2^4 + \lfloor n_s/2 \rfloor$, or $c_{init} = \lfloor n_s^{init}/2 \rfloor * \lfloor n_s/2 \rfloor$.

Example 5

It is assumed that the start time domain location of the first signal is the start radio frame index $n_f^{init}$ and the start subframe index $n_{sf}^{init}$ or $\lfloor n_s^{init}/2 \rfloor$ of the first signal, where $n_s$ is a time slot index, and the current time domain location of the first signal is the current subframe index $n_f$, then $c_{init} = (10 n_f^{init} + n_{sf}^{init})*2^{10} + n_f$, or $c_{init} = (10 n_f^{init} + \lfloor n_s^{init}/2 \rfloor)*2^{10} + n_f$, or $c_{init} = (10 n_f^{init} + n_{sf}^{init}) + n_f*2^{14}$, or $c_{init} = (10 n_f^{init} + \lfloor n_s^{init}/2 \rfloor) + n_f*2^{14}$, or $c_{init} = ((10 n_f^{init} + n_{sf}^{init})*n_f)$, or $c_{init} = ((10 n_f^{init} + \lfloor n_s^{init}/2 \rfloor)*n_f)$, or $c_{init} = (n_f - n_f^{init})*2^4 + n_{sf}^{init}$, or $c_{init} = (n_f - n_f^{init})*2^4 + \lfloor n_s^{init}/2 \rfloor$, or $c_{init} = (10 n_f^{init} + \lfloor n_s^{init}/2 \rfloor)*2^1 + n_f \bmod 2$, or $c_{init} = (10 n_f^{init} + \lfloor n_s^{init}/2 \rfloor) + n_f \bmod q_1 * 2^{14}$ or $c_{init} = n_f^{init} \bmod q_1 * 2^w + n_f \bmod q_2 * 2^4 + \lfloor n_s^{init}/2 \rfloor$, where $q_1$, $q_2$ are preset values, and the value of $w$ is determined at least according to $q_2$.

Example 6

It is assumed that the start time domain location of the first signal is the start radio frame index $n_f^{init}$ of the first signal, and the current time domain location of the first signal is the current radio frame index $n_f$ and the current subframe index $\lfloor n_s/2 \rfloor$, then $c_{init} = (10 n_f + \lfloor n_s/2 \rfloor)*2^{10} + n_f^{init}$, or $c_{init} = (10 n_f + \lfloor n_s/2 \rfloor) + n_f^{init} * 2^{14}$, or $c_{init} = ((10 n_f + \lfloor n_s/2 \rfloor)*n_f^{init})$, or $c_{init} = (n_f - n_f^{init}) * 2^4 + \lfloor n_s/2 \rfloor$, or $c_{init} = (10 n_f + \lfloor n_s/2 \rfloor)*2^w + n_f^{init} \bmod q_1$, or $c_{init} = (10 n_f + \lfloor n_s/2 \rfloor) + n_f^{init} \bmod q_1 * 2^{14}$, or $c_{init} = n_f^{init} \bmod q_1 * 2^w + n_f \bmod q_2 * 2^4 + \lfloor n_s/2 \rfloor$, where $q_1$, $q_2$ are preset values, and the value of $w$ is determined at least according to $q_2$.

Example 7

It is assumed that the start time domain location of the first signal is the start radio frame index $n$ and the start subframe index $n_{sf}^{init}$ or $\lfloor n_s^{init}/2 \rfloor$ of the first signal, where $n_s$ is a time slot index, and the current time domain location of the first signal is the current radio frame index $n_f$ and the current subframe index $\lfloor n_s/2 \rfloor$, then $c_{init} = (n_f^{init}*2^{18} + n_f*2^8 + \lfloor n/2 \rfloor*2^4 + \lfloor n_s^{init}/2 \rfloor)$, or $c_{init} = (n_f^{init} \bmod q_1*2^w + n_f \bmod q_2*2^8 + \lfloor n_s/*2 \rfloor*2^4 + \Im n_s^{init}/2 \rfloor)$, or $c_{init} = (10 n_f*2^{22} + 10 n_f^{init}*2^8 + \lfloor n_s^{init}/2 \rfloor*2^4 + \lfloor n_s/2 \rfloor) \bmod 2^{31}$, or $c_{init} = n_f*2^{18} + n_f^{init}*2^8 + \Im n_s^{init}/2 \rfloor*2^4 + \lfloor n_s/2 \rfloor$, or $c_{init} = (10 n_f - 10 n_f^{init})*2^8 + \lfloor n_s/2 \rfloor*2^4 + \lfloor n_s^{init}/2 \rfloor$, or $c_{init} = (10 n_f - 10 n_f^{init})*2^8 + \lfloor n_s^{init}/2 \rfloor*2^4 + \lfloor n_s/2 \rfloor$, or $c_{init} = (n_f - n_f^{init})*2^8 + \lfloor n_s^{init}/2 \rfloor*2^4 + \lfloor n_s/2 \rfloor$, or $c_{init} = ((10 n_f + \lfloor n_s/2 \rfloor)(10 n_f^{init} + \lfloor n_s^{init}/2 \rfloor)) \bmod 2^{31}$, or $c_{init} = (10 n_f + \lfloor n_s/2 \rfloor)*2^{14} + (10 n_f^{init} + \lfloor n_s^{init}/2 \rfloor)$, where $q_1, q_2$ are preset values, the value of $w$ is determined at least according to $q_2$.

Example 8

It is assumed that the start time domain location of the first signal is the start subframe index $n_{sf}^{init}$ or $\lfloor n_s^{init}/2 \rfloor$ of the first signal, where $n_s$ is a time slot index, and the current time domain location of the first signal is the current radio frame index $n$ and the current subframe index $\lfloor n_s/2 \rfloor$, then $c_{init} = n_f*2^8 + \lfloor n_s/2 \rfloor*2^3 + \lfloor n_s^{init}/2 \rfloor$, or $c_{init} = n_f \bmod q_1*2^8 + \lfloor n_s^{init}/2 \rfloor*2^3 + \lfloor n_s/2 \rfloor$, or, $c_{init} = n_f*2^8 + \lfloor n_s^{init}/2 \rfloor*2^3 + \lfloor n_s/2 \rfloor$, or $c_{init} = n_f*2^4 + \lfloor n_s/2 \rfloor - \lfloor n_s^{init}/2 \rfloor$ or, $c_{init} = n_f \bmod q_1*2^4 + \lfloor n_s/2 \rfloor - \lfloor n_s^{init}/2 \rfloor$, or $c_{init} = n_f*2^8 + \lfloor n_s/2 \rfloor*\lfloor n_s^{init}/2 \rfloor$, or $c_{init} = n_f*2^8 + \lfloor n_s/2 \rfloor*\lfloor n_s^{init}/2 \rfloor$, or $c_{init} = n_f \bmod q_1*2^8 + \lfloor n_s/2 \rfloor*\lfloor n_s^{init}/2 \rfloor$, where $q_1$ is a preset value.

Example 9

It is assumed that the start time domain location of the first signal is the start subframe index $n_{sf}^{init}$ or $\lfloor n_s^{init}/2 \rfloor$ of the first signal, where $n_s$ is a time slot index, and the current time domain location of the first signal is the first offset value $\Delta$ of the current subframe relative to the start subframe of the first signal, then $c_{init}=\lfloor n_s/2 \rfloor *2^{11}+\Delta$, or $c_{init}=\lfloor n_s^{init}/2 \rfloor *\Delta$.

Example 10

It is assumed that the start time domain location of the first signal is the start radio frame index $n_f^{init}$ of the first signal, and the second offset value of the current radio frame of the first signal relative to the start radio frame of the first signal is $\Delta$, then $c_{init}=\lfloor n_f^{init}*2^4+\Delta \rfloor$, or $c_{init}=n_f^{init}*\Delta$, or $c_{init}=n_f^{init}$ mod $q_1*2^4+\Delta$, or $c_{init}=n_f^{init}$ mod $q_1*\Delta$, where $q_1$ is a preset value.

In addition to the above examples, any solution in which $C_{init}$ includes the start time domain location information of the first signal and the current time domain location information of the first signal belongs to the protection scope of the disclosure. The start time domain location of the first signal includes at least one of the following: the start time domain location information corresponding to the first signal and the start time domain location information of the first channel search space corresponding to the first signal, wherein the start time domain location information includes: the start radio frame index and/or the start subframe index. The current time domain location information of the first signal includes one of the following: the current radio frame index, the current subframe index, the first offset value of the current subframe relative to the start subframe of the first signal, the second offset value of the current radio frame relative to the start radio frame of the first signal, the third offset value of the current subframe relative to the start radio frame of the first signal, and the fourth offset value of the current radio frame relative to the start subframe of the first signal.

Specific Embodiment 2

It is assumed that the cell index corresponding to the first signal is $N_{ID}^{Cell}$, then u corresponding to the second sequence satisfies $u=mod(N_{ID}^{Cell},126)+3$, and $$\theta = \frac{T}{132} * \left\lfloor \frac{N_{ID}^{Cell}}{126} \right\rfloor,$$

where the value of T is preset. Alternatively, it is assumed that the cell index corresponding to the first signal is $N_{ID}^{Cell}$, then u corresponding to the second sequence satisfies $u=mod(N_{ID}^{Cell}, N_{ZC})$, and $\theta=0$.

It is assumed that the first sequence is a pseudo-random sequence, then taking $N_{PN}=128$ as an example:

$c(t)=[1-2x_0((t+m_0) \bmod 127)][1-2x_1((t+m_1) \bmod 127)]$ $0 \le t < 127$ where $x_0(i+7)=(x_0(i+4)+x_0(i)) \bmod 2$ $x_1(i+7)=(x_1(i+1)+x_1(i)) \bmod 2$ and the corresponding initial value is $[x_0(6)x_0(5)x_0(4)x_0(3)x_0(2)x_0(1)x_0(0)]=[0000001]$ $[x_1(6)x_1(5)x_1(4)x_1(3)x_1(2)x_1(1)x_1(0)]=[0000001]$ where Nc is a preset value. The operation of determining the first sequence at least according to the start time domain location information of the first signal and the current time domain location information of the first signal refers to determining the values of $m_0$ and $m_1$, specifically as follows.

Example 1

$m_0$ represents the start time domain location information of the first signal, and $m_1$ represents the current time domain location information of the first signal, specifically:

$m_0=10n_f^{init}+\lfloor n_s^{init}/2 \rfloor$, and $m_1=10n_f+\lfloor n_s/2 \rfloor$ or $m_0=n_f^{init}$, $m_1=10n_f+\lfloor n_s/2 \rfloor$, or $m_0=10n_f^{init}+\lfloor n_s^{init}/2 \rfloor$, $m_1=10n_f$ or $m_0=10n_f^{init}+\lfloor n_s^{init}/2 \rfloor$, $m_1=\Delta$ or $m_0=10n_f^{init}+\lfloor n_s^{init}/2 \rfloor$, $m_1=n_f$ or $m_0=n_f^{init}$, $m_1=10n_f+\lfloor n_s/2 \rfloor$ or $m_0=n_f^{init}$, $m_1=n_f$ mod $q_1*2^4+\lfloor n_s/2 \rfloor$ or $m_0=n_f^{init}$ mod $q_1*2^4+\lfloor n_s^{init}/2 \rfloor$, $m_1=n_f$ or $m_0=n_f^{init}$, $m_1=n_f$ mod $q_1*2^4+\lfloor n_s/2 \rfloor$ where $q_1$ is a preset value.

Example 2

$m_1$ represents the start time domain location information of the first signal, and $m_0$ represents the current time domain location information of the first signal, specifically:

$m_1=10n_f^{init}+\lfloor n_s^{init}/2 \rfloor$, and $m_0=10n_f+\lfloor n/2 \rfloor$ or $m_1=n_f^{init}$, $m_0=10n_f+\lfloor n_s/2 \rfloor$ or $m_1=10n_f^{init}+\lfloor n_s^{init}/2 \rfloor$, $m_0=n_f$ or $m_1=10n_f^{init}+\lfloor n_s^{init}/2 \rfloor$, $m_0=\Delta$ or $m_1=n_f^{init}$, $m_0=n_f$ mod $q_1*2^4+\lfloor n_s/2 \rfloor$ or $m_1=n_f^{init}$ mod $q_1*2^4+\lfloor n_s^{init}/2 \rfloor$, $m_0=n_f$ or $m_1=n_f^{init}$ mod $q_1*2^4+\lfloor n_s^{init}/2 \rfloor$, $m_0=\Delta$ where $q_1$ is a preset value.

In addition to the above examples, any solution in which $m_0$ or $m_1$ include the start time domain location information of the first signal or the current time domain location information of the first signal belongs to the protection scope of the disclosure. The start time domain location of the first signal includes at least one of the following: the start time domain location information corresponding to the first signal and the start time domain location information of the first channel search space corresponding to the first signal, wherein the start time domain location information includes: the start radio frame index and/or the start subframe index. The current time domain location information of the first signal includes one of the following: the current radio frame index, the current subframe index, the first offset value of the current subframe relative to the start subframe of the first signal, the second offset value of the current radio frame relative to the start radio frame of the first signal, the third offset value of the current subframe relative to the start radio frame of the first signal, and the fourth offset value of the current radio frame relative to the start subframe of the first signal.

Specific Embodiment 3

It is assumed that the cell index corresponding to the first signal is $N_{ID}^{Cell}$, then u corresponding to the second sequence satisfies $u=mod(N_{ID}^{Cell},126)+3$, and $$\theta = \frac{T}{132} * \left\lfloor \frac{N_{ID}^{Cell}}{126} \right\rfloor,$$

where the value of T is preset. Alternatively, it is assumed that the cell index corresponding to the first signal is $N_{ID}^{Cell}$, then u corresponding to the second sequence satisfies $u=mod(N_{ID}^{Cell}, N_{ZC})$, and $\theta=0$.

It is assumed that the first sequence is composed of a pseudo-random sequence, specifically $$c(t) = \begin{cases} 1, & \text{if } z(2i) = 0 \text{ and } z(2i+1) = 0 \\ -1, & \text{if } z(2i) = 0 \text{ and } z(2i+1) = 1 \\ j, & \text{if } z(2i) = 1 \text{ and } z(2i+1) = 0 \\ -j, & \text{if } z(2i) = 1 \text{ and } z(2i+1) = 1 \end{cases}$$

where $t=0, 1, \ldots, N_{PN}-1$. It is assumed that $N_{PN}=132$, then $z(i)$ is a pseudo-random sequence, where $i=0, 1, 2, \ldots, 2*132-1$. $z(i)$ is generated in the following manners, then determining the first sequence at least according to the start time domain location information of the first signal and the current time domain location information of the first signal refers to determining the initial value of the second m-sequence. It is assumed that the first sequence is a pseudo-random sequence, specifically $z(t)=mod(x_1(t+N_c)+x_2(t+N_c), 2)$, where $$x_1(t+31)=mod(x_1(t+3)+x_1(t),2)$$

$$x_2(t+31)=mod(x_2(t+3)+x_2(t+2)+x_2(t+1)+x_2(t),2)$$

Nc is a preset value. The operation of determining the first sequence at least according to the start time domain location information of the first signal and the current time domain location information of the first signal refers to determining the initial value $c_{init}$ of the second m-sequence, referring to embodiment 3 for the value of $c_{init}$.

In addition to the above examples, any solution in which $C_{init}$ includes the start time domain location information of the first signal and the current time domain location information of the first signal belongs to the protection scope of the disclosure. The start time domain location of the first signal includes at least one of the following: the start time domain location information corresponding to the first signal and the start time domain location information of the first channel search space corresponding to the first signal, wherein the start time domain location information includes: the start radio frame index and/or the start subframe index. The current time domain location information of the first signal includes one of the following: the current radio frame index, the current subframe index, the first offset value of the current subframe relative to the start subframe of the first signal, the second offset value of the current radio frame relative to the start radio frame of the first signal, the third offset value of the current subframe relative to the start radio frame of the first signal, and the fourth offset value of the current radio frame relative to the start subframe of the first signal.

Optional Embodiment 2

It is assumed that a base station sends a first signal, wherein a sequence corresponding to the first signal consists of a first sequence and a second sequence, and the first sequence and the second sequence are determined in the second manner. The first sequence is a pseudo-random sequence or generated based on a pseudo-random sequence, and is preferably a Gold sequence. The second sequence is a ZC sequence, specifically:

$d(n)=c(m)*e^{-j2\pi\theta n}*e^{-j\pi u n'(n'+1)/N_{zc}}$, where $n'=mod(n, N_{ZC})$, $m=mod(n, N_{PN})$, the value of m is 0, 1, 2, ..., M-1, $N_{ZC}$ is the length of the second sequence, $N_{PN}$ is the length of the first sequence, the value of $N_{PN}$ is preset or equals to xM, where x is a positive integer greater than or equal to 1, $\theta$ is a cyclic shift corresponding to the second sequence, and u is a root sequence index corresponding to the second sequence. It is assumed that the position of the first signal mapped in the subframe is shown in FIG. 3, then the value of $N_{ZC}$ is a prime number less than 132.

Specific Embodiment 1

The operation of determining a root sequence and/or a cyclic shift corresponding to the second sequence according to a cell index corresponding to the first signal and current time domain location information of the first signal refers to determining the value of u and/or the value of $\theta$, specifically:

$$u = (f_{gh}(n_s) + f_{ss}) \bmod N_{zc}$$

$$\text{where } f_{gh}(n_s) = (\sum_{i=0}^{7} c(8*X+i)*2^i) \bmod(N_{zc}) \text{ and } c_{init} = \left\lfloor \frac{N_{ID}^{cell}}{N_{zc}} \right\rfloor,$$

initialization is performed for every M radio frames, where the value of M is pre-determined; $f_{ss}=(N_{ID}^{Cell})\bmod N_{zc}$ or $f_{ss}=(N_{ID}^{Cell}+p)\bmod N_{zc}$, and the value of p is configured by signaling; the value of X is determined according to the current time domain location information of the first signal; and/or $$\theta = \frac{T}{132} * \bmod \left( \left\lfloor \frac{N_{ID}^{Cell}}{N_{zc}} \right\rfloor + Z, 131 \right),$$

where T is a pre-determined value, and the value of Z is determined according to the current time domain location information of the first signal.

It is assumed that the current time domain location of the first signal is the current radio frame index $n_f$, the current time domain location of the first signal is the first offset value $\Delta_1$ of the current subframe relative to the start subframe of the first signal, and the current time domain location of the first signal is the second offset value $\Delta_2$ of the current radio frame relative to the start radio frame of the first signal, then the value of X is one of the following:

$X=mod(10n_f+\lfloor n_s/2 \rfloor, 10M)$, $X=\Delta_1$, $X=mod(n_f,M)$,
$X=n_f$, $X=\Delta_2$;

and the value of Z is one of the following:

$Z=10n_f+\lfloor n_s/2 \rfloor$, $Z=\Delta_1$, $Z=\mathrm{mod}(n_f,M)$, $Z=n_f$ $Z=\Delta_2$, and $Z=\lfloor n_s/2 \rfloor$.

It is assumed that the first sequence is a pseudo-random sequence, as illustrated in the specific embodiment 1. The operation of determining the first sequence according to the start time domain location information of the first signal refers to determining the initial value $c_{init}$ of the second m-sequence. The start time domain location of the first signal is the start radio frame index $n_f^{init}$ of the first signal, and the start subframe index is $\lfloor n_s^{init}/2 \rfloor$, then the value of $c_{init}$ is one of the following:

$c_{init}==n_f^{init}$, $c_{init}=\lfloor n_s^{init}/2 \rfloor$, $c_{init}=10n_f^{init}+\lfloor n_s^{init}/2 \rfloor$ and $c_{init}=n_f^{init} \bmod q_1 * 2^4 + \lfloor n_s^{init}/2 \rfloor$.

Specific Embodiment 2

The operation of determining the root sequence and/or the cyclic shift corresponding to the second sequence according to the cell index corresponding to the first signal and the current time domain location information of the first signal refers to determining the value of u and/or the value of θ, specifically:

$u = (f_{gh}(n_s) + f_{ss}) \bmod N_{zc}$ where $f_{gh}(n_s) = (\sum_{i=0}^{7} c(8*X+i)*2^i) \bmod (N_{zc})$ and $c_{init} = \left\lfloor \frac{N_{ID}^{cell}}{N_{zc}} \right\rfloor$, initialization is performed for every M radio frames, where the value of M is pre-determined; $f_{ss}=(N_{ID}^{Cell}) \bmod N_{zc}$ or $f_{ss}=(N_{ID}^{Cell}+p) \bmod N_{zc}$, and the value of p is configured by signaling; the value of X is determined according to the current time domain location information of the first signal; and/or $\theta = \frac{T}{132} * \mathrm{mod}(\left\lfloor \frac{N_{ID}^{Cell}}{N_{zc}} \right\rfloor + Z, 131)$, where T is a pre-determined value, and the value of Z is determined according to the current time domain location information of the first signal.

It is assumed that the start time domain location of the first signal is the start radio frame index $n_f^{init}$ of the first signal, the current time domain location of the first signal is the current subframe index $n_f$, the current time domain location of the first signal is the first offset value $\Delta_1$ of the current subframe relative to the start subframe of the first signal, and the current time domain location of the first signal is the second offset value $\Delta_2$ of the current radio frame relative to the start radio frame of the first signal, then the value of X is one of the following:

$X=\mathrm{mod}(10n_f+\lfloor n_s/2 \rfloor, 10M)$, $X=\Delta_1$, $X=\mathrm{mod}(n_f,M)$, $X=n_f$ $X=\Delta_2$;

and the value of Z is one of the following:

$Z=10n_f+\lfloor n_s/2 \rfloor$, $Z=\Delta_1$, $Z=\mathrm{mod}(n_f,M)$, $Z=n_f$ $Z=\Delta_2$ and $Z=\lfloor n_s/2 \rfloor$.

It is assumed that the first sequence is a pseudo-random sequence, as illustrated in the specific embodiment 2. The operation of determining the first sequence according to the start time domain location information of the first signal refers to determining $m_0$ and $m_1$, then the value of $m_0$ is one of the following: $m_0=n_f^{init}$ and $m_0=\lfloor n_s^{init}/2 \rfloor$; and the value of $m_1$ is one of the following: $m_1=N_f^{init}$ and $m_1=\lfloor n_s^{init}/2 \rfloor$.

Specific Embodiment 3

The operation of determining the root sequence and/or the cyclic shift corresponding to the second sequence according to the cell index corresponding to the first signal and the current time domain location information of the first signal refers to determining the value of u and/or the value of θ, specifically:

$u = (f_{gh}(n_s) + f_{ss}) \bmod N_{zc}$ where $f_{gh}(n_s) = (\sum_{i=0}^{7} c(8*X+i)*2^i) \bmod (N_{zc})$ and $c_{init} = \left\lfloor \frac{N_{ID}^{cell}}{N_{zc}} \right\rfloor$, initialization is performed for every M radio frames, where the value of M is pre-determined; $f_{ss}=(N_{ID}^{Cell}) \bmod N_{zc}$ or $f_{ss}=(N_{ID}^{Cell}+p) \bmod N_{zc}$, and the value of p is configured by signaling; the value of X is determined according to the current time domain location information of the first signal; and/or $\theta = \frac{T}{132} * \mathrm{mod}(\left\lfloor \frac{N_{ID}^{Cell}}{N_{zc}} \right\rfloor + Z, 131)$, where T is a pre-determined value, and the value of Z is determined according to the current time domain location information of the first signal.

It is assumed that the start time domain location of the first signal is the start radio frame index $N_f^{init}$ of the first signal, the current time domain location of the first signal is the current subframe index $n_f$, the current time domain location of the first signal is the first offset value $\Delta_1$ of the current subframe relative to the start subframe of the first signal, and the current time domain location of the first signal is the second offset value $\Delta_2$ of the current radio frame relative to the start radio frame of the first signal, then the value of X is one of the following:

$X=\mathrm{mod}(10n_f+\lfloor n_s/2 \rfloor, 10M)$, $X=\Delta_1$, $X=\mathrm{mod}(n_f,M)$, $X=n_f$ $X=\Delta_2$;

and the value of Z is one of the following:

$Z=10n_f+\lfloor n_s/2 \rfloor$, $Z=\Delta_1$, $Z=\mathrm{mod}(n_f,M)$, $Z=n_f$ $Z=\Delta_2$ and $Z=\lfloor n_s/2 \rfloor$.

It is assumed that the first sequence is generated based on the pseudo-random sequence, as illustrated in the specific embodiment 3. The operation of determining the first sequence according to the start time domain location information of the first signal refers to determining $c_{init}$, then the value of $c_{init}$ is one of the following:

$c_{init}=n_f^{init}$, $c_{init}=\lfloor n_s^{init}/2 \rfloor$, $c_{init}=10n_f^{init}+\lfloor n_s^{init}/2 \rfloor$ and $c_{init}=n_f^{init} \bmod q_1 * 2^4 + \lfloor n_s^{init}/2 \rfloor$, where $q_1$ is a preset value.

Optional Embodiment 3

It is assumed that a base station sends a first signal, wherein a sequence corresponding to the first signal consists of a first sequence and a second sequence, and the first sequence and the second sequence are determined in the third manner. The first sequence is a pseudo-random sequence or generated based on a pseudo-random sequence, and is preferably a Gold sequence. The second sequence is a ZC sequence, specifically:

$d(n)=c(m)*e^{-j2\pi\theta n}*e^{-j\pi u n'(n'+1)/N_{ZC}}$, where n'=mod(n,$N_{ZC}$), m=mod(n,$N_{PN}$), $N_{ZC}$ is the length of the second sequence, $N_{PN}$ is the length of the first sequence, the value of $N_{PN}$ is preset or equals to xM, where x is a positive integer greater than or equal to 1, θ is the cyclic shift corresponding to the second sequence, and u is a root sequence index corresponding to the second sequence. It is assumed that the position of the first signal mapped in the subframe is shown in FIG. 3, then the value of $N_{ZC}$ is a prime number less than 132.

Specific Embodiment 1

It is assumed that the cell index corresponding to the first signal is $N_{ID}^{Cell}$, then u corresponding to the second sequence satisfies u=mod($N_{ID}^{Cell}$, $Thr_1$)+$Thr_2$, and $$\theta = \frac{T}{132} * \left\lfloor \frac{N_{ID}^{Cell}}{Thr_1} \right\rfloor,$$

where the values of Thr1, Thr2 and T are preset. Alternatively, it is assumed that the cell index corresponding to the first signal is $N_{ID}^{Cell}$, then u corresponding to the second sequence satisfies u=mod($N_{ID}^{Cell}$, Nzc), and θ=0.

It is assumed that the first sequence is a pseudo-random sequence, specifically $c(t)=mod(x_1(t+N_c)+x_2(n+N_c),2)$, where $x_1(n+31)=mod(x_1(n+3)+x_1(n),2)$ $x_2(n+31)=mod(x_2(n+3)+x_2(n+2)+x_2(n+1)+x_2(n),2)$ where t=0, 1, 2, . . . , $N_{PN}$−1, and Nc is a preset value. The operation of determining the first sequence at least according to the start time domain location information of the first signal, the current time domain location information of the first signal and the cell index corresponding to the first signal refers to determining the initial value $c_{init}$ of the second m-sequence.

Example 1

It is assumed that the start time domain location of the first signal is the start radio frame index $n_f^{init}$ of the first signal, and the current time domain location of the first signal is the current radio frame index $n_f$, then $c_{init}=n_f*2^{19}+n_f^{init}*2^9+N_{ID}^{Cell}$, or $c_{init}=n_f^{init}*2^{19}+n_f*2^9+N_{ID}^{Cell}$, or $c_{init}=n_f^{init}*n_f*2^9+N_{ID}^{Cell}$, or $c_{init}=(n_f-n_f^{init})*2^9+N_{ID}^{Cell}$, or $c_{init}=(n_f-n_f^{init})*N_{ID}^{Cell}$, or $c_{init}=(n_f+n_f^{init})*N_{ID}^{Cell}$, or $c_{init}=n_f$ mod $q_1*2^w+n_f^{init}$ mod $q_2*2^9+N_{ID}^{Cell}$, or $c_{init}=n_f^{init}$ mod $q_1*2^w+n_f$ mod $q_2*2^9+N_{ID}^{Cell}$, or $c_{init}=((N_{ID}^{Cell}+1)(n_f$ mod $q_2+1)*2^9+N_{ID}^{Cell})$mod $2^{31}$, $q_1+1)(n_f^{init}$ where $q_1$, $q_2$ are preset values, the value of w is determined at least according to $q_2$.

Example 2

It is assumed that the start time domain location of the first signal is the start radio frame index $n_f^{init}$ of the first signal, and the current time domain location of the first signal is the current subframe index $\lfloor n_s/2 \rfloor$, where $n_s$ is a time slot index, then $c_{init}=n_f^{init}*2^4+\lfloor n_s/2 \rfloor$, or $c_{init}=n_f^{init}*\lfloor n_s/2 \rfloor$, or $c_{init}=n_f^{init}$ mod $q_1*2^4+\lfloor n_s/2 \rfloor$, or $c_{init}=((N_{ID}^{Cell}+1)((10n_f^{init}+\lfloor n_s/2 \rfloor)$mod 8192+1)*$2^9$+ $N_{ID}^{Cell}$)mod $2^{31}$ where $q_1$ is a preset value.

Example 3

It is assumed that the start time domain location of the first signal is the start sub-frame index $\lfloor n_s^{init}/2 \rfloor$ of the first signal, and the current time domain location of the first signal is the current radio frame index $n_f$, where $n_s$ is a time slot index,
then $c_{init}=n_f*2^{13}+\lfloor n_s^{init}/2 \rfloor*2^9+N_{ID}^{Cell}$, or $c_{init}=n_f*\lfloor n_s^{init}/2 \rfloor*2^9+N_{ID}^{Cell}$, or $c_{init}=n_f$ mod $q_1*2^8+\lfloor n_s^{init}/2 \rfloor*2^4+N_{ID}^{Cell}$, or $c_{init}=((N_{ID}^{Cell}+1)((10n_f+\lfloor n_s^{init}/2 \rfloor)$mod 8192+1)*$2^9$+ $N_{ID}^{Cell}$)mod $2^{31}$, where $q_1$ is a preset value.

Example 4

It is assumed that the start time domain location of the first signal is the start subframe index $\lfloor n_s^{init}/2 \rfloor$ of the first signal, and the current time domain location of the first signal is the current subframe index $\lfloor n_s/2 \rfloor$, where $n_s$ is a time slot index,
then $c_{init}=\lfloor n_s^{init}/2 \rfloor*2^{13}+\lfloor n_s/2 \rfloor*2^9+N_{ID}^{Cell}$, or $c_{init}=\lfloor n_s^{init}/2 \rfloor*\lfloor n_s^{init}/2 \rfloor*2^9+N_{ID}^{Cell}$, or $c_{init}=((N_{ID}^{Cell}+1)(\lfloor n_s/2 \rfloor)(\lfloor n_s^{init}/2 \rfloor)+1)*2^9+N_{ID}^{Cell})$mod $2^{31}$.

Example 5

It is assumed that the start time domain location of the first signal is the start radio frame index $n_f^{init}$ and the start subframe index $\lfloor n_s^{init}/2 \rfloor$ of the first signal, where $n_s$ is a time slot index, and the current time domain location of the first signal is the current subframe index $n_f$, then $c_{init}=(10n_f^{init}+\lfloor n_s^{init}/2 \rfloor)*2^{19}+n_f*2^9+N_{ID}^{Cell})$mod $2^{31}$, or $c_{init}=n_f^{init}$ mod $q_1*2^w+n_f$ mod $q_2*2^{13}+\lfloor n_s^{init}/2 \rfloor*2^9+N_{ID}^{Cell}$, or $c_{init}=(N_{ID}^{Cell}+n_f*2^9+((10n_f^{init}+\lfloor n_s^{init}/2 \rfloor)$mod 8192+1)*$2^{19}$)mod $2^{31}$, or $c_{init}=(N_{ID}^{Cell}+n_f*((10n_f^{init}+\lfloor n_s^{init}/2 \rfloor)$mod 8192+1)*$2^9$)mod $2^{31}$, or $c_{init}=(N_{ID}^{Cell}+((10n_f^{init}+\lfloor n_s^{init}/2 \rfloor+1)*(n_f$ mod $2+1))*2^9)$mod $2^{31}$, or $c_{init}=(n_f-n_f^{init})*2^{13}+\lfloor n_s^{init}/2 \rfloor*2^9+N_{ID}^{Cell}$, or $c_{init}=((N_{ID}^{Cell}+1)(n_f+1)((10n_f^{init}+\lfloor n_s^{init}/2 \rfloor) \bmod 8192+1)*2^9+N_{ID}^{Cell}) \bmod 2^{31}$, or, $c_{init}=((N_{ID}^{Cell}+1)(n_f \bmod 2+1)((10n_f^{init}+\lfloor n_s^{init}/2 \rfloor) \bmod 8192+1)*2^9+N_{ID}^{Cell}) \bmod 2^{31}$, where $q_1$, $q_2$ are preset values, the value of w is determined at least according to $q_2$.

Example 6

It is assumed that the start time domain location of the first signal is the start radio frame index $n_f^{init}$ of the first signal, and the current time domain location of the first signal is the current radio frame index $n_f$ and the current subframe index $\lfloor n_s/2 \rfloor$, then $c_{init}=n_f^{init} \bmod 2*2^{14}+\lfloor n_s/2 \rfloor *2^{10}+n_f \bmod 2*2^9 + N_{ID}^{Cell}$, or $c_{init}=n_f^{init} \bmod 2*2^{14}+n_f \bmod 2*2^{13}+\lfloor n_s/2 \rfloor *2^9 + N_{ID}^{Cell}$, or $c_{init}=(N_{ID}^{Cell}+n*2^9+((10n_f+\lfloor n_s/2 \rfloor) \bmod 8192)+1)*2^{19}) \bmod 2^{31}$, or $c_{init}=N_{ID}^{Cell}+n_f^{init} \bmod 2*2^9+((10n_f+\lfloor n_s/2 \rfloor) \bmod 8192)+1)*2^{10}$, or $c_{init}=(N_{ID}^{Cell}+n_f^{init}*((10n_f+\lfloor n_s/2 \rfloor) \bmod 8192)+1)*2^9) \bmod 2^{31}$, or $c_{init}=(N_{ID}^{Cell}+((10n_f+\lfloor n_s/2 \rfloor \bmod 8192+1)*(n_f \bmod 2+1))*2^9) \bmod 2^{31}$, or $c_{init}=(n_f-n_f^{init})*2^{13}+\lfloor n_s/2 \rfloor *2^9+N_{ID}^{Cell}$, or $c_{init}=((N_{ID}^{Cell}+1)(n_f^{init} \bmod 2+1)((10n_f+\lfloor n_s/2 \rfloor) \bmod 8192+1)*2^9+N_{ID}^{Cell}) \bmod 2^{31}$.

Example 7

It is assumed that the start time domain location of the first signal is the start radio frame index $n_f^{init}$ and the start subframe index $n_{sf}^{init}$ or $\lfloor n_s^{init}/2 \rfloor$ of the first signal, where $n_s$ is a time slot index, and the current time domain location of the first signal is the current radio frame index $n_f$ and the current subframe index $\lfloor n_s/2 \rfloor$, then $c_{init}=((10n_f+\lfloor n_s/2 \rfloor) \bmod 8192+1)((10n_f^{init}+\lfloor n_s^{init}/2 \rfloor) \bmod 8192+1)*2^9+N_{ID}^{Cell}) \bmod 2^{31}$, or $c_{init}=r((n_f-n_f^{init})*2^{18}+\lfloor n_s/2 \rfloor *2^{13}+\lfloor n_s^{init}/2 \rfloor *2^9 + N_{ID}^{Cell}) \bmod 2^{31}$ or, $c_{init}=((n_f+n_f^{init})*2^{18}+\lfloor n_s/2 \rfloor *2^{13}+\lfloor n_s^{init}/2 \rfloor *2^9+N_{ID}^{Cell}) \bmod 2^{31}$, or $c_{init}=((N_{ID}^{Cell}+1)(10n_f+\lfloor n_s/2 \rfloor) \bmod 8192+1)$ $((10n_f^{init}+\lfloor n_s^{init}/2 \rfloor) \bmod 8192+1)*2^9+N_{ID}^{Cell}) \bmod 2^{31}$.

Example 8

It is assumed that the start time domain location of the first signal is the start subframe index $n_{sf}^{init}$ or $\lfloor n_s^{init}/2 \rfloor$ of the first signal, and the current time domain location of the first signal is the first offset value $\Delta$ of the current subframe relative to the start subframe of the first signal, then $c_{init}=\lfloor n_s^{init}/2 \rfloor *2^{13}+\Delta *2^9+N_{ID}^{Cell}$ or, $c_{init}=\lfloor n_s^{init}/2 \rfloor *\Delta *2^9+N_{ID}^{Cell}$.

Example 9

It is assumed that the start time domain location of the first signal is the start radio index $n_f^{init}$ of the first signal, and the current time domain location of the first signal is the first offset value $\Delta$ of the current subframe relative to the start subframe of the first signal, then $c_{init}=n_f^{init}*2^{13}+\Delta *2^9+N_{ID}^{Cell}$ or $c_{init}=n_f^{init}*\Delta *2^9+N_{ID}^{Cell}$ or $c_{init}=((N_{ID}^{Cell}+1)(n_f^{init} \bmod 2+1)(\Delta+1)*2^9+N_{ID}^{Cell}) \bmod 2^{31}$ or $c_{init}=((N_{ID}^{Cell}+1)(n_f^{init} \bmod 2+1)(\Delta \bmod 1024+1)*2^9+N_{ID}^{Cell}) \bmod 2^{31}$.

In addition to the above examples, any solution in which $C_{init}$ includes the start time domain location information of the first signal and the current time domain location information of the first signal belongs to the protection scope of the disclosure. The start time domain location of the first signal includes at least one of the following: the start time domain location information corresponding to the first signal and the start time domain location information of the first channel search space corresponding to the first signal, for example, when the first signal is a WUS signal, wherein the start time domain location information includes: the start radio frame index and/or the start subframe index. The current time domain location information of the first signal includes one of the following: the current radio frame index, the current subframe index, the first offset value of the current subframe relative to the start subframe of the first signal, the second offset value of the current radio frame relative to the start radio frame of the first signal, the third offset value of the current subframe relative to the start radio frame of the first signal, and the fourth offset value of the current radio frame relative to the start subframe of the first signal.

Specific Embodiment 2

It is assumed that the cell index corresponding to the first signal is $N_{ID}^{Cell}$, then u corresponding to the second sequence satisfies $u=\bmod(N_{ID}^{Cell}, Thr_1)+Thr_2$, and $$\theta = \frac{T}{132} * \left\lfloor \frac{N_{ID}^{Cell}}{126} \right\rfloor,$$

where the values of T, Thr1 and Thr2 are preset. Alternatively, it is assumed that the cell index corresponding to the first signal is $N_{ID}^{Cell}$, then u corresponding to the second sequence satisfies u=mod($N_{ID}^{Cell}$, $N_{ZC}$), and θ=0.

It is assumed that the first sequence is a pseudo-random sequence, and taking $N_{PN}$=128 as an example, specifically:

$c(t)=[1-2x_0((t+m_0) \bmod 127)][1-2x_0((t+m_1) \bmod 127)]$,

0≤t<127 where $x_0(i+7)=(x_0(i+4)+x_0(i)) \bmod 2$ $x_1(i+7)=(x_1(i+1)+x_1(i)) \bmod 2$;

and the corresponding initial value is:

$[x_0(6)x_0(5)x_0(4)x_0(3)x_0(2)x_0(1)x_0(0)]=[0000001]$ $[x_1(6)x_1(5)x_1(4)x_1(3)x_1(2)x_1(1)x_1(0)]=[0000001]$

Nc is a preset value. The operation of determining the first sequence at least according to the start time domain location information of the first signal, the current time domain location information of the first signal and the cell index corresponding to the first signal refers to determining the value of $m_0$ and $m_1$, specifically as follows.

Example 1

$m_0$ represents the start time domain location information of the first signal and the cell index information corresponding to the first sequence, and $m_1$ represents the current time domain location information of the first signal. $m_0$ may be determined by one of the following: $m_0=((10n_f^{init}+\lfloor n_s^{init}/2 \rfloor) \bmod 8192+1)*(N_{ID}^{Cell}+1)*2^9+N_{ID}^{Cell}$, or $m_0=(10n_f^{init}+\lfloor n_s^{init}/2 \rfloor)*2^9+N_{ID}^{Cell}$, or $m_0=10n_f^{init}*2^{13}+\lfloor n_s^{init}/2 \rfloor*2^9+N_{ID}^{Cell}$, or $m_0=n_f^{init} \bmod q_1*2^{13}+\lfloor n_s^{init}/2 \rfloor*2^9+N_{ID}^{Cell}$, where $q_1$ is a preset value.

$m_1$ may be determined by one of the following: $m_1=10n_f*2^4+\lfloor n_f^{init}/2 \rfloor$, or $m_1=n_f$, or $m_1=\Delta$, or $m_1=n_f$, or $m=\lfloor n_s/2 \rfloor$, or $m_1=n_f \bmod 2*2^4+\lfloor n_s/2 \rfloor$.

Or, $m_0=((10n_f+\lfloor n_s/2 \rfloor) \bmod 8192+1)*(N_{ID}^{Cell}+1)*2^9+N_{ID}^{Cell}$.

Example 2

$m_1$ represents the start time domain location information of the first signal, and $m_0$ represents the current time domain location information of the first signal and the cell index corresponding to the first signal. $m_0$ may be determined by one of the following:

$m_0=((10n_f+\lfloor n_s/2 \rfloor) \bmod 8192+1)*(N_{ID}^{Cell}+1)*2^9+N_{ID}^{Cell}$, or $m_0=(10n_f+\lfloor n_s/2 \rfloor)*2^9+N_{ID}^{Cell}$, or $m_0=10n_f*2^{13}+\lfloor n/2 \rfloor*2^9+N_{ID}^{Cell}$, or $m_0=n_f q_1*2^{13}+\lfloor n_s/2 \rfloor*2^9+N_{ID}^{Cell}$, where $q_1$ is a preset value.

$m_1$ may be determined by one of the following: $m_1=10n_f^{init}*2^4+\lfloor n_s^{init}/2 \rfloor$, or $m_1=10n_f^{init}$, or $m_1=\Delta$, or $m_1=n_f^{init}$, or $m_1=\lfloor n_s^{init}/2 \rfloor$, or $m_1=n_f^{init} \bmod q_1*2^4+\lfloor n_s^{init}/2 \rfloor$, where $q_1$ is a preset value.

Or, $m_0=((10n_f^{init}+\lfloor n_s^{init}/2 \rfloor) \bmod 8192+1)*(N_{ID}^{Cell}+1)*2^9+N_{ID}^{Cell}$.

In addition to the above examples, any solution in which $m_0$ or $m_1$ include the start time domain location information of the first signal or the current time domain location information of the first signal belongs to the protection scope of the disclosure. The start time domain location of the first signal includes at least one of the following: the start time domain location information corresponding to the first signal and the start time domain location information of the first channel search space corresponding to the first signal, wherein the start time domain location information includes: the start radio frame index and/or the start subframe index. The current time domain location information of the first signal includes one of the following: the current radio frame index, the current subframe index, the first offset value of the current subframe relative to the start subframe of the first signal, the second offset value of the current radio frame relative to the start radio frame of the first signal, the third offset value of the current subframe relative to the start radio frame of the first signal, and the fourth offset value of the current radio frame relative to the start subframe of the first signal.

Specific Embodiment 3

It is assumed that the cell index corresponding to the first signal is $N_{ID}^{Cell}$, then u corresponding to the second sequence satisfies $u=\bmod(N_{ID}^{Cell},126)+3$, and $$\theta = \frac{T}{132} * \left\lfloor \frac{N_{ID}^{Cell}}{126} \right\rfloor,$$

where the value of T is preset. Alternatively, it is assumed that the cell index corresponding to the first signal is $N_{ID}^{Cell}$, then u corresponding to the second sequence satisfies u=mod ($N_{ID}^{Cell}$, $N_{ZC}$), and θ=0.

It is assumed that the first sequence is composed of a pseudo-random sequence, specifically $$c(t) = \begin{cases} 1, & \text{if } z(2i) = 0 \text{ and } z(2i+1) = 0 \\ -1, & \text{if } z(2i) = 0 \text{ and } z(2i+1) = 1 \\ j, & \text{if } z(2i) = 1 \text{ and } z(2i+1) = 0 \\ -j, & \text{if } z(2i) = 1 \text{ and } z(2i+1) = 1 \end{cases},$$

where z(i) is a pseudo-random sequence, t=0, 1, 2, ..., $N_{PN}-1$, and taking $N_{PN}$=132 as an example, then i=0, 1, ..., 263. z(i) is generated in the following manners, then determining the first sequence at least according to the start time domain location information of the first signal and the current time domain location information of the first signal refers to determining the initial value of the second m-sequence, referring to the specific embodiment 1 of the present embodiment.

In addition to the above examples, any solution in which $c_{init}$ includes the start time domain location information of the first signal and the current time domain location information of the first signal belongs to the protection scope of the disclosure. The start time domain location of the first signal includes at least one of the following: the start time domain location information corresponding to the first signal and the start time domain location information of the first channel search space corresponding to the first signal, wherein the start time domain location information includes: the start radio frame index and/or the start subframe index. The current time domain location information of the first signal includes one of the following: the current radio frame index, the current subframe index, the first offset value of the current subframe relative to the start subframe of the first signal, the second offset value of the current radio frame relative to the start radio frame of the first signal, the third offset value of the current subframe relative to the start radio frame of the first signal, and the fourth offset value of the current radio frame relative to the start subframe of the first signal.

Optional Embodiment 4

It is assumed that a base station sends a first signal, wherein a sequence corresponding to the first signal consists of a first sequence and a second sequence, and the first sequence and the second sequence are determined in the fourth manner. The first sequence is a pseudo-random sequence or generated based on a pseudo-random sequence, and is preferably a Gold sequence. The second sequence is a ZC sequence, specifically:

$d(n)=c(m)*e^{-j2\pi\theta n}*e^{-j\pi un'(n'+1)/N_{zc}}$, where n'=mod(n,$N_{ZC}$), m=mod(n,$N_{PN}$), $N_{ZC}$ is the length of the second sequence, $N_{PN}$ is the length of the first sequence, the value of $N_{PN}$ is preset or equals to xM, where x is a positive integer greater than or equal to 1, θ is the cyclic shift corresponding to the second sequence, and u is a root sequence index corresponding to the second sequence. It is assumed that the position of the first signal mapped in the subframe is shown in FIG. 3, then the value of $N_{ZC}$ is a prime number less than 132.

Specific Embodiment 1

The operation of determining the root sequence and/or the cyclic shift corresponding to the second sequence according to the cell index corresponding to the first signal and the current time domain location information of the first signal refers to determining the value of u and/or the value of θ, specifically:

$$u = (f_{gh}(n_s) + f_{ss}) \bmod N_{zc}$$

where $f_{gh}(n_s) = \left(\sum_{i=0}^{7} c(8*X+i)*2^i\right) \bmod(N_{zc})$ and $c_{init} = \left\lfloor \frac{N_{ID}^{cell}}{N_{zc}} \right\rfloor$, initialization is performed for every M radio frames, where the value of M is pre-determined; $f_{ss}=(N_{ID}^{Cell}) \bmod N_{zc}$ or $f_{ss}=(N_{ID}^{Cell}+p) \bmod N_{zc}$, and the value of p is configured by signaling; the value of X is determined according to the current time domain location information of the first signal; and/or $$\theta = \frac{T}{132} * \bmod\left(\left\lfloor \frac{N_{ID}^{Cell}}{N_{zc}} \right\rfloor + Z, 131\right),$$

where T is a pre-determined value, and the value of Z is determined according to the current time domain location information of the first signal.

It is assumed that the current time domain location of the first signal is the current radio frame index $n_f$, the current time domain location of the first signal is the first offset value $\Delta_1$ of the current subframe relative to the start subframe of the first signal, and the current time domain location of the first signal is the second offset value $\Delta_2$ of the current radio frame relative to the start radio frame of the first signal, then the value of X is one of the following:

$X=\bmod(10n_f+\lfloor n_s/2 \rfloor, 10M)$, $X=\Delta_1$, $X=\bmod(n_f,M)$, $X=n_f$ and $X=\Delta_2$;

and the value of Z is one of the following:

$Z=10n_f+\lfloor n_s/2 \rfloor$, $Z=\Delta_1$, $Z=\bmod(n_f,M)$, $Z=n_f$, $Z=\Delta_2$ and $Z=\lfloor n_s/2 \rfloor$.

It is assumed that the first sequence is a pseudo-random sequence, as illustrated in the specific embodiment 1. The operation of determining the first sequence according to the start time domain location information of the first signal and the cell index corresponding to the first signal refers to determining the initial value $c_{init}$ of the second m-sequence. The start time domain location of the first signal is the start radio frame index $c_{init}$ of the first signal, and the start subframe index is $\lfloor n_s^{init}/2 \rfloor$, then the value of $c_{init}$ is one of the following:

$c_{init}=n_f^{init}*2^9+N_{ID}^{Cell}$, or $c_{init}=\lfloor n_s^{init}/2 \rfloor*2^9+N_{ID}^{Cell}$, or $c_{init}=((10n_f^{init}+\lfloor n_s^{init}/2 \rfloor) \bmod 8192+1)*2^9+N_{ID}^{Cell}$, or $c_{init}=(N_{ID}^{Cell}+1)((10n_f^{init}+\lfloor n_s^{init}/2 \rfloor) \bmod 8192+1)*2^9+N_{ID}^{Cell}$.

Specific Embodiment 2

The operation of determining the root sequence and/or the cyclic shift corresponding to the second sequence according to the cell index corresponding to the first signal and the current time domain location information of the first signal refers to determining the value of u and/or the value of θ, specifically:

$$u = (f_{gh}(n_s) + f_{ss}) \bmod N_{zc}$$

where $f_{gh}(n_s) = \left(\sum_{i=0}^{7} c(8*X+i)*2^i\right) \bmod(N_{zc})$ and $c_{init} = \left\lfloor \frac{N_{ID}^{cell}}{N_{zc}} \right\rfloor$, initialization is performed for every M radio frames, where the value of M is pre-determined; $f_{ss}=(N_{ID}^{Cell}) \bmod N_{zc}$ or $f_{ss}=(N_{ID}^{Cell}+p) \bmod N_{zc}$, and the value of p is configured by signaling; the value of X is determined according to the current time domain location information of the first signal; and/or $$\theta = \frac{T}{132} * \bmod\left(\left\lfloor \frac{N_{ID}^{Cell}}{N_{zc}} \right\rfloor + Z, 131\right),$$

where T is a pre-determined value, and the value of Z is determined according to the current time domain location information of the first signal.

It is assumed that the start time domain location of the first signal is the start radio frame index $n_f^{init}$ of the first signal, the current time domain location of the first signal is the current subframe index $n_f$, the current time domain location of the first signal is the first offset value $\Delta_1$ of the current subframe relative to the start subframe of the first signal, and the current time domain location of the first signal is the second offset value $\Delta_2$ of the current radio frame relative to the start radio frame of the first signal, then the value of X is one of the following:

$X=\bmod(10n_f+\lfloor n_s/2 \rfloor, 10M)$, $X=\Delta_1$, $X=\bmod(n_f,M)$, $X=n_f$ and $X=\Delta_2$;

and the value of Z is one of the following:

$Z=10n_f+\lfloor n_s/2 \rfloor$, $Z=\Delta_1$, $Z=\text{mod}(n_f,M)$, $Z=n_f$, $Z=\Delta_2$ and $Z=\lfloor n_s/2 \rfloor$.

It is assumed that the first sequence is a pseudo-random sequence, as illustrated in the specific embodiment 2. The operation of determining the first sequence according to the start time domain location information of the first signal and the cell index corresponding to the first signal refers to determining $m_0$ and $m_1$, then the value of $m_0/m_1$ is one of the following: $n_f^{init}*2^9 + N_{ID}^{Cell}$, $\lfloor n_s^{init}/2 \rfloor*2^9+N_{ID}^{Cell}$, $N_{ID}^{Cell}$, $10n_f^{init}+\lfloor n_s^{init}/2 \rfloor$, $\lfloor n_s^{init}/2 \rfloor$ and $n_f^{init}$. A specific example is $m_0=N_{ID}^{Cell}$, and $m_1=10n_f^{init}+\lfloor n_s^{init}/2 \rfloor$.

Specific Embodiment 3

The operation of determining the root sequence and/or the cyclic shift corresponding to the second sequence according to the cell index corresponding to the first signal and the current time domain location information of the first signal refers to determining the value of u and/or the value of θ, specifically:

$$u = (f_{gh}(n_s) + f_{ss}) \text{mod} N_{zc}$$

where $f_{gh}(n_s) = \left(\sum_{i=0}^{7} c(8*X+i)*2^i\right) \text{mod}(N_{zc})$ and $c_{init} = \left\lfloor \frac{N_{ID}^{cell}}{N_{zc}} \right\rfloor$, initialization is performed for every M radio frames, where the value of M is pre-determined; $f_{ss}=(N_{ID}^{Cell}) \text{mod } N_{zc}$ or $f_{ss}=(N_{ID}^{Cell}+p) \text{mod } N_{zc}$, and the value of p is configured by signaling; the value of X is determined according to the current time domain location information of the first signal; and/or $$\theta = \frac{T}{132} * \text{mod}\left(\left\lfloor \frac{N_{ID}^{Cell}}{N_{zc}} \right\rfloor + Z, 131\right),$$

where T is a pre-determined value, and the value of Z is determined according to the current time domain location information of the first signal.

It is assumed that the start time domain location of the first signal is the start radio frame index $n_f^{init}$ of the first signal, the current time domain location of the first signal is the current subframe index $n_f$, the current time domain location of the first signal is the first offset value $\Delta_1$ of the current subframe relative to the start subframe of the first signal, and the current time domain location of the first signal is the second offset value $\Delta_2$ of the current radio frame relative to the start radio frame of the first signal, then the value of X is one of the following:

$X=\text{mod}(10n_f+\lfloor n_s/2 \rfloor,10M)$, $X=\Delta_1$, $X=\text{mod}(n_f,M)$, $X=n_f$ and $X=\Delta_2$;

and the value of Z is one of the following:

$Z=10n_f+\lfloor n_s/2 \rfloor$, $Z=\Delta_1$, $Z=\text{mod}(n_f,M)$, $Z=n_f$, $Z=\Delta_2$ and $Z=\lfloor n_s/2 \rfloor$.

It is assumed that the first sequence is generated based on the pseudo-random sequence, as illustrated in specific embodiment 3. The operation of determining the first sequence according to the start time domain location information of the first signal and the cell index corresponding to the first signal refers to determining $c_{init}$ then the value of $c_{init}$ is one of the following:

$c_{init}=n_f^{init}*2^9+N_{ID}^{Cell}$, $c_{init}=\lfloor n_s^{init}/2 \rfloor*2^9+N_{ID}^{Cell}$, $c_{init}=((10n_f^{init}+\lfloor n_s^{init}/2 \rfloor) \text{mod } 8192+1)*2^9+N_{ID}^{Cell}$, and $c_{init}=(N_{ID}^{Cell}+1)((10n_f^{init}+\lfloor n_s^{init}/2 \rfloor) \text{mod } 8192+1)*2^9+N_{ID}^{Cell}$.

Optional Embodiment 5

It is assumed that a base station generates a sequence corresponding to a first signal, wherein the sequence corresponding to the first signal consists of a first sequence and a second sequence. The first sequence is a pseudo-random sequence or generated based on a pseudo-random sequence, and the second sequence is a ZC sequence, specifically:

$d(n)=c(m)*e^{-j2\pi\theta n}*e^{-j\pi un'(n'+1)/N_{zc}}$, where $n'=\text{mod}(n, N_{ZC})$, $m=\text{mod}(n, N_{PN})$, $N_{ZC}$ is the length of the second sequence, $N_{PN}$ is the length of the first sequence, the value of $N_{PN}$ is preset, θ is a cyclic shift corresponding to the second sequence, and u is a root sequence index corresponding to the second sequence. It is assumed that the position of the first signal mapped in the subframe is shown in FIG. 3, then n=0, 1, ..., 131, the value of $N_{ZC}$ is a prime number less than 132, taking $N_{ZC}=131$ as an example.

It is assumed that the cell index corresponding to the first signal is $N_{ID}^{Cell}$, then u corresponding to the second sequence satisfies $u=\text{mod}(N_{ID}^{Cell}, Thr_1)+Thr_2$, and $$\theta = \frac{T}{132} * \left\lfloor \frac{N_{ID}^{Cell}}{Thr_1} \right\rfloor,$$

where the values of T, Thr1 and Thr2 are preset, for example, Thr1=126, Thr2=3 and T=33. Alternatively, it is assumed that the cell index corresponding to the first signal is $N_{ID}^{Cell}$, then u corresponding to the second sequence satisfies $u=\text{mod}(N_{ID}^{Cell}, Nzc)$, and θ=0.

If group hopping is configured, then $$u = (f_{gh}(n_s) + f_{ss}) \text{mod} N_{zc},$$

where $f_{gh}(n_s) = \left(\sum_{i=0}^{7} c(8*X+i)*2^i\right) \text{mod}(N_{zc})$, $c_{init} = \left\lfloor \frac{N_{ID}^{cell}}{N_{zc}} \right\rfloor$, initialization is performed for every M radio frames, where the value of M is pre-determined; $f_{ss}=(N_{ID}^{Cell}) \text{mod } N_{zc}$ or $f_{ss}=(N_{ID}^{Cell}+p) \text{mod } N_{zc}$, and the value of p is configured by signaling, and $X=\lfloor n_s/2 \rfloor$.

Optional Embodiment 6

Specific Embodiment 1

It is assumed that the first sequence is a pseudo-random sequence, and taking $N_{PN}=128$ as an example, specifically:

$c(t)=[1-2x_0((t+m_0) \text{mod } 127)][1-2x_1((t+m_1) \text{mod } 127)]$ $0 \leq t < 127$ where, $x_0(i+7)=(x_0(i+4)+x_0(i)) \text{mod } 2$ $x_1(i+7)=(x_1(i+1)+x_1(i)) \text{mod } 2$;

and the corresponding initial value is:

$[x_0(6)x_0(5)x_0(4)x_0(3)x_0(2)x_0(1)x_0(0)]=[0000001]$ $[x_1(6)x_1(5)x_1(4)x_1(3)x_1(2)x_1(1)x_1(0)]=[0000001]$

Nc is a preset value, $$m_0 = \left\lfloor \frac{N_{ID}^{Cell}}{126} \right\rfloor,$$

$$m_1 = ((10n_f + \lfloor n_s/2 \rfloor) \bmod N_{du}) + N_{du}\left(\left\lfloor \frac{n_f^{init}}{8} \right\rfloor * \bmod\left(\frac{8}{N_{du}}\right)\right)$$

where $N_{du}$ is the time domain length when the first signal is transmitted.

Specific Embodiment 2

It is assumed that the first sequence is composed of a pseudo-random sequence, specifically, $$c(t) = \begin{cases} 1, & \text{if } z(2i) = 0 \text{ and } z(2i+1) = 0 \\ -1, & \text{if } z(2i) = 0 \text{ and } z(2i+1) = 1 \\ j, & \text{if } z(2i) = 1 \text{ and } z(2i+1) = 0 \\ -j, & \text{if } z(2i) = 1 \text{ and } z(2i+1) = 1 \end{cases}$$

where z(i) is a pseudo-random sequence, t=0, 1, 2, ..., $N_{PN}$−1, and i=0, 1, 2, ..., $2N_{PN}$−1. The z(i) is generated in the same way as c(m) in the specific embodiment 1 in the optional embodiment 3. $c_{init}=((N_{ID}^{Cell}+1)(\Delta+1)((10n_f^{init}+\lfloor n_s^{init}/2 \rfloor \bmod 8192+1)*2^9+N_{ID}^{Cell}) \bmod 2^{31}$, where Δ is the current subframe of the first signal, which is equivalent to the offset value of the start subframe of the first signal.

In the above embodiments, the position of the first signal mapped in the subframe is shown in FIG. 3. In this case, the first signal occupies 11 symbols in the subframe. If the first signal is mapped to all the symbols in the subframe, that is, the first signal occupies 14 symbols in the subframe, then $N_{PN}$ and/or $N_{ZC}$ corresponding to the first signal in the above embodiments may be adopted, that is, the manner of generating the basic sequence remains unchanged, and the sequence occupying 14 symbols is obtained by means of circular extension; or, the first sequence and the second sequence are generated according to 14 symbols.

In the above embodiments, the start radio frame index $n_f^{init}$ of the first signal may also be the start radio frame index of the first channel search space corresponding to the first signal. It is assumed that the first signal is the wake-up signal, then the start radio frame index of the first signal is the start radio frame index corresponding to the wake-up signal, or the start radio frame index of a PDCCH search space corresponding to the wake-up signal. When paging information is carried on the PDCCH, the start radio frame index of the first signal may be the start radio frame index on a PO. The start subframe index $\lfloor n_s^{init}/2 \rfloor$ of the first signal may also be the start subframe index of the first channel search space corresponding to the first signal. It is assumed that the first signal is the wake-up signal, then the start subframe index of the first signal may be the start subframe index corresponding to the wake-up signal, or the start subframe index of the PDCCH search space corresponding to the wake-up signal. When the paging information is carried on the PDCCH, the start subframe index of the first signal may be the start subframe index on the PO.

Optional Embodiment 7

Figure 4:
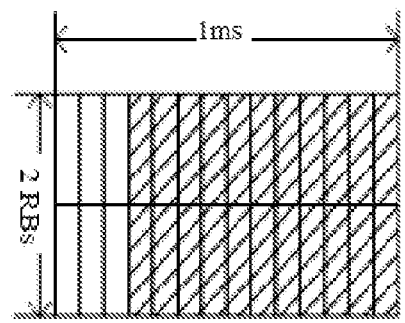
FIG. 4 is a second schematic diagram of a signal sending method according to an optional embodiment of the disclosure.

A base station generates a sequence corresponding to a first signal, wherein the sequence corresponding to the first signal consists of a first sequence and a second sequence. The first sequence is a Hadamard sequence, and the second sequence is a ZC sequence, specifically:

$$d(n)=c_q(m)*e^{-j\pi un'(n'+1)/N_{ZC}}$$

where n'=mod(n,$N_{ZC}$), m=mod(n,$N_H$), $N_{ZC}$ is the length of the second sequence, $N_H$ is the length of the first sequence. It is assumed that the position of the first signal mapped in the subframe is shown in FIG. 4, then n=0, 1, ..., 263, the value of $N_{ZC}$ is a prime number less than 132.

Example 1

Taking $N_{ZC}$=261 as an example, the value of $N_H$ is 128 or 256. If the sequence index of the first sequence and the root sequence index of the second sequence are determined according to the cell index corresponding to the first signal, then $$u = N_{ID}^{Cell} \bmod 126 + Thr$$

$$q = \left\lfloor \frac{N_{ID}^{Ncell}}{126} \right\rfloor$$

It is assumed that Thr2=3.

It is assumed that $N_H$ is 128, then the corresponding $c_q$ is the index in Hadamard (128), which is {0, 31, 63, 127}.

It is assumed that $N_H$ is 256, then the corresponding $c_q$ is the index in Hadamard (256), which is {0, 63, 127, 255}.

Example 2

Taking $N_{ZC}$=261 as an example, the value of $N_H$ is 128 or 256. If the sequence index of the first sequence and the root sequence index of the second sequence are determined according to the cell index corresponding to the first signal, then $$u = N_{ID}^{Cell} \bmod 252 + Thr_2$$

$$q = \left\lfloor \frac{N_{ID}^{Ncell}}{252} \right\rfloor$$

It is assumed that Thr2=3.

It is assumed that $N_H$ is 128, then the corresponding $c_q$ is the index in Hadamard (128), which is {0, 63}.

It is assumed that $N_H$ is 256, then the corresponding $c_q$ is the index in Hadamard (256), which is {0, 127}.

Optional Embodiment 8

Figure 5:
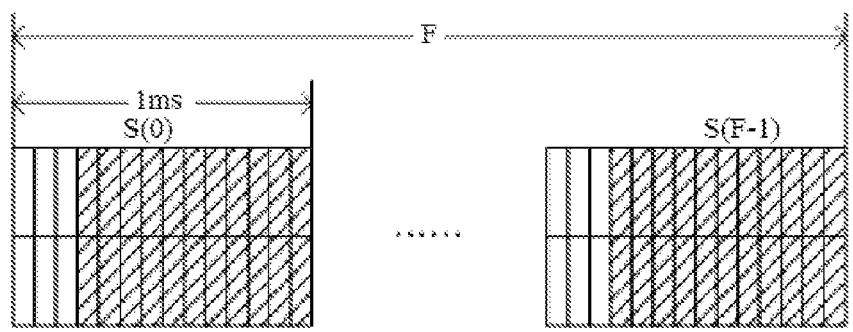
FIG. 5 is a third schematic diagram of a signal sending method according to an optional embodiment of the disclosure.

When the first signal is used for synchronization, the sequence further includes a third subsequence. It is assumed that the number of subframes corresponding to the first signal is F, then the sequence corresponding to the first signal is specifically:

$$d(n)=S(F)*c_q(m)*e^{-j\pi un'(n'+1)/N_{ZC}},$$

where f=0, 1, ..., F−1. As shown in FIG. 5, S(f) is an orthogonal sequence with length F. It is assumed that F=4, then S(f)=[1 −1 1 −1]. Or, the orthogonal sequence is selected according to a cell ID. It is assumed that F=4, there are four orthogonal sequences S1, S2, S3 and S4. The used orthogonal sequence is selected according to the cell index corresponding to the first signal.

Alternatively, S(f) is generated based on a fourth sequence. It is assumed that the fourth sequence is [1, −1], then S(f) is obtained by generating a PN sequence with length F based on the fourth sequence. The initial value of the PN sequence is generated at least according to the cell index corresponding to the first signal. Specifically, when the value of the PN sequence is 1, S(f)=1, and $d(n)=c_q(m)*e^{-j\pi un'(n'+1)/N_{zc}}$; and when the value of the PN sequence is 0, S(f)=−1, and $d_f(n)=-1*c_q(m)*e^{-j\pi un'(n'+1)/N_{zc}}$.

Alternatively, S(f) is generated based on the fourth sequence. It is assumed that the fourth sequence is [d, d*], then S(f) is obtained by generating a PN sequence with length F based on the fourth sequence. The initial value of the PN sequence is generated at least according to the cell index corresponding to the first signal. Specifically, when the value of the PN sequence is 1, S(f) is d, the concrete meaning of which is $d_f(n)=c_q(m)*e^{-j\pi un'(n'+1)/N_{zc}}$; and when the value of the PN sequence is 0, S(f) is d*, the concrete meaning of which is $d_f(n)=(c_q(m)*e^{-j\pi un'(n'+1)/N_{zc}})*$.

Alternatively, S(f) is generated based on the fourth sequence. It is assumed that the fourth sequence is [1, −1], then S(f) is obtained based on the fourth sequence. When f is an odd number, S(f)=1, and $d_f(n)=c_q(m)*e^{-j\pi un'(n'+1)/N_{zc}}$; and when f is an even number, S(f)=−1, $d_f(n)=-1*c_q(m)*e^{-j\pi un'(n'+1)/N_{zc}}$; vice versa.

Alternatively, S(f) is generated based on the fourth sequence. It is assumed that the fourth sequence is [d, d*], then S(f) is obtained based on the fourth sequence. When f is an even number, S(f) is d, the concrete meaning of which is $d_f(n)=c_q(m)*e^{-j\pi un'(n'+1)/N_{zc}}$; and when f is an odd number, S(f) is d*, the concrete meaning of which is $d_f(n)=(c_q(m)*e^{-j\pi un'(n'+1)/N_{zc}})*$; vice versa.

Through the above description of the implementations, those skilled in the art may clearly know that the method according to the above embodiments may be implemented by means of software plus a necessary common hardware platform, or by means of hardware; but in many cases, the former is a better implementation. Based on this understanding, the essence of the technical solution of the embodiments of the disclosure or the part making a contribution to the related technology can be embodied in the form of software product. The computer software product is stored in a storage medium (for example, a Read-Only Memory (ROM)/Random Access Memory (RAM), a magnetic disk, and a compact disc) and includes a number of instructions to make a computer device (which can be a personal computer, a server or a network device, etc.) execute all or part of the method in each embodiment of the disclosure.

Embodiment 2

The present embodiment provides a signal sending apparatus, which is configured to implement the above embodiments and exemplary implementations. The embodiments which have been elaborated will not be repeated here. The term "module" used below can realize a combination of software and/or hardware with an intended function. Although the apparatus described in the following embodiment is realized through software better, the realization through hardware or a combination of software and hardware is possible and conceivable.

Figure 6:
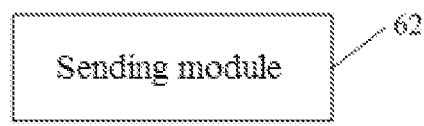
FIG. 6 is a structure diagram of a signal sending apparatus according to an embodiment of the disclosure.

FIG. 6 is a structure diagram of a signal sending apparatus according to an embodiment of the disclosure As shown in FIG. 6, the apparatus is applied to a base station, and includes:

1) a sending module 62, configured to send the first signal. A sequence of the first signal is generated at least based on a first sequence and a second sequence. The first sequence and the second sequence are determined in one of the following manners. In a first manner, the first sequence is determined at least according to start time domain location information of the first signal and current time domain location information of the first signal, and the second sequence is determined at least according to a cell index corresponding to the first signal. In a second manner, the first sequence is determined at least according to the start time domain location information of the first signal, and the second sequence is determined at least according to the cell index corresponding to the first signal and the current time domain location information of the first signal. In a third manner, the first sequence is determined at least according to the start time domain location information of the first signal, the current time domain location information of the first signal, and the cell index corresponding to the first signal, and the second sequence is determined at least according to the cell index corresponding to the first signal. In a fourth manner, the first sequence is determined at least according to the start time domain location information of the first signal and the cell index corresponding to the first signal, and the second sequence is determined at least according to the cell index corresponding to the first signal and the current time domain location information of the first signal. In a fifth manner, the first sequence and the second sequence are determined at least according to the cell index corresponding to the first signal.

In an exemplary implementation of the embodiment, the first sequence is a pseudo-random sequence, and the second sequence is a ZC sequence; or, the first sequence is a Hadamard sequence, and the second sequence is a ZC sequence. When the first sequence is the pseudo-random sequence and the second sequence is the ZC sequence, an initial value of the pseudo-random sequence is determined in the manner of determining the first sequence, and a root sequence index and/or a cyclic shift index corresponding to the ZC sequence are/is determined in the manner of determining the second sequence. When the first sequence is the Hadamard sequence and the second sequence is the ZC sequence, the operation that the first sequence and the second sequence are determined according to the cell index corresponding to the first signal includes that: a sequence index of the first sequence and a root sequence index of the second sequence are determined according to the cell index corresponding to the first signal.

In an exemplary implementation of the embodiment, the start time domain location information of the first signal includes at least one of the following: a start radio frame index, a start subframe index, a start radio frame index of a first channel search space corresponding to the first signal and a start subframe index of the first channel search space corresponding to the first signal.

In an exemplary implementation of the embodiment, the current time domain location information of the first signal includes at least one of the following: a current radio frame index, a current subframe index, a first offset value of a current subframe relative to the start subframe of the first signal, the second offset value of the current radio frame relative to a start radio frame of the first signal, a third offset value of the current subframe relative to a start radio frame of the first signal, and a fourth offset value of the current radio frame relative to the start subframe of the first signal.

In an exemplary implementation of the embodiment, the first signal includes at least one of a synchronization signal and a wake-up signal. When the first signal is a synchronization signal, the sequence of the first signal is generated further based on the third sequence. The third sequence is an orthogonal sequence with a length F, or the third sequence is generated based on a fourth sequence with a length G, where F is a total number of subframes corresponding to the first signal, and G is a positive integer less than or equal to F.

By determining the first sequence and the second sequence through the apparatus shown in FIG. 6, the problem in the related technology that a specific method for generating a sequence corresponding to a newly introduced signal has not been proposed is solved, and the technical effect of effectively sending signals is achieved.

Figure 7:
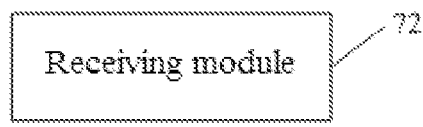
FIG. 7 is a structure diagram of a signal receiving apparatus according to an embodiment of the disclosure.

The present embodiment also provides a signal receiving apparatus. As shown in FIG. 7, the apparatus is applied to UE, and includes:

1) a receiving module 72, configured to receive a first signal sent by a base station. A sequence of the first signal is generated at least based on a first sequence and a second sequence. The first sequence and the second sequence are determined in one of the following manners. In a first manner, the first sequence is determined at least according to start time domain location information of the first signal and current time domain location information of the first signal, and the second sequence is determined at least according to a cell index corresponding to the first signal. In a second manner, the first sequence is determined at least according to the start time domain location information of the first signal, and the second sequence is determined at least according to the cell index corresponding to the first signal and the current time domain location information of the first signal. In a third manner, the first sequence is determined at least according to the start time domain location information of the first signal, the current time domain location information of the first signal, and the cell index corresponding to the first signal, and the second sequence is determined at least according to the cell index corresponding to the first signal. In a fourth manner, the first sequence is determined at least according to the start time domain location information of the first signal and the cell index corresponding to the first signal, and the second sequence is determined at least according to the cell index corresponding to the first signal and the current time domain location information of the first signal. In a fifth manner, the first sequence and the second sequence are determined at least according to the cell index corresponding to the first signal.

In an exemplary implementation of the embodiment, the first sequence is a pseudo-random sequence, and the second sequence is a ZC sequence; or, the first sequence is a Hadamard sequence, and the second sequence is a ZC sequence. When the first sequence is the pseudo-random sequence and the second sequence is the ZC sequence, an initial value of the pseudo-random sequence is determined in the manner of determining the first sequence, and a root sequence index and/or a cyclic shift index corresponding to the ZC sequence are/is determined in the manner of determining the second sequence. When the first sequence is the Hadamard sequence and the second sequence is the ZC sequence, the operation that the first sequence and the second sequence are determined according to the cell index corresponding to the first signal includes that: a sequence index of the first sequence and a root sequence index of the second sequence are determined according to the cell index corresponding to the first signal.

In an exemplary implementation of the embodiment, the start time domain location information of the first signal includes at least one of the following: a start radio frame index, a start subframe index, a start radio frame index of a first channel search space corresponding to the first signal and a start subframe index of the first channel search space corresponding to the first signal.

In an exemplary implementation of the embodiment, the current time domain location information of the first signal includes at least one of the following: a current radio frame index, a current subframe index, a first offset value of a current subframe relative to a start subframe of the first signal, a second offset value of a current radio frame relative to a start radio frame of the first signal, a third offset value of the current subframe relative to the start radio frame of the first signal, and a fourth offset value of the current radio frame relative to the start subframe of the first signal.

In an exemplary implementation of the embodiment, the first signal includes at least one of a synchronization signal and a wake-up signal. When the first signal is a synchronization signal, the sequence of the first signal is generated further based on the third sequence. The third sequence is an orthogonal sequence with a length F, or the third sequence is generated based on a fourth sequence with a length G, where F is a total number of subframes corresponding to the first signal, and G is a positive integer less than or equal to F.

By determining the first sequence and the second sequence through the apparatus shown in FIG. 7, the problem in the related technology that a specific method for generating a sequence corresponding to a newly introduced signal has not been proposed is solved, and the technical effect of effectively sending signals is achieved.

It is to be noted that, each of the above modules may be realized by software or hardware.

For the latter, each of the above modules may be realized by, but not limited to, the following way: all of the above modules are in the same processor; or, the above modules are respectively in different processors in the form of any combination.

Third Embodiment

The embodiment of the disclosure also provides a storage medium. The storage medium stores a computer program. The computer program is configured to execute, when running, operations in any of the above method embodiments.

In an exemplary implementation of the embodiment, the storage medium may be set to store a computer program for executing the following operation.

In operation S1, a first signal is sent. A sequence of the first signal is generated at least based on a first sequence and a second sequence. The first sequence and the second sequence are determined in one of the following manners. In a first manner, the first sequence is determined at least according to start time domain location information of the first signal and current time domain location information of the first signal, and the second sequence is determined at least according to a cell index corresponding to the first signal. In a second manner, the first sequence is determined at least according to the start time domain location information of the first signal, and the second sequence is determined at least according to the cell index corresponding to the first signal and the current time domain location information of the first signal. In a third manner, the first sequence is determined at least according to the start time domain location information of the first signal, the current time domain location information of the first signal, and the cell index corresponding to the first signal, and the second sequence is determined at least according to the cell index corresponding to the first signal. In a fourth manner, the first sequence is determined at least according to the start time domain location information of the first signal and the cell index corresponding to the first signal, and the second sequence is determined at least according to the cell index corresponding to the first signal and the current time domain location information of the first signal. In a fifth manner, the first sequence and the second sequence are determined at least according to the cell index corresponding to the first signal.

In an exemplary implementation of the embodiment, the storage medium include, but not limited to, a USB flash disk, a Read-Only Memory (ROM), a Random Access Memory (RAM), a mobile hard disk, a magnetic disk, a compact disc, and other medium capable of storing the computer program.

The embodiment of the disclosure also provides an electronic device, which includes a memory and a processor. The memory stores a computer program. The processor is configured to run the computer program to execute operations in any of the above method embodiments.

In an exemplary implementation of the embodiment, the electronic device may also include a transmission device and an input/output device. The transmission device is connected with the processor, and the input/output device is connected with the processor.

In an exemplary implementation of the embodiment, the processor may be configured to execute the following operation through the computer program.

In operation S1, a first signal sent by a base station is received. A sequence of the first signal is generated at least based on a first sequence and a second sequence. The first sequence and the second sequence are determined in one of the following manners. In a first manner, the first sequence is determined at least according to start time domain location information of the first signal and current time domain location information of the first signal, and the second sequence is determined at least according to a cell index corresponding to the first signal. In a second manner, the first sequence is determined at least according to the start time domain location information of the first signal, and the second sequence is determined at least according to the cell index corresponding to the first signal and the current time domain location information of the first signal. In a third manner, the first sequence is determined at least according to the start time domain location information of the first signal, the current time domain location information of the first signal, and the cell index corresponding to the first signal, and the second sequence is determined at least according to the cell index corresponding to the first signal. In a fourth manner, the first sequence is determined at least according to the start time domain location information of the first signal and the cell index corresponding to the first signal, and the second sequence is determined at least according to the cell index corresponding to the first signal and the current time domain location information of the first signal. In a fifth manner, the first sequence and the second sequence are determined at least according to the cell index corresponding to the first signal.

In an exemplary embodiment, the specific examples in the present embodiment may refer to the examples described in the above embodiments and alternative embodiments.

It is apparent that those skilled in the art should appreciate that the above modules and operations in the embodiments of the disclosure may be implemented by a general-purpose computing device, and they may be centralized in a single computing device or distributed on a network composed of multiple computing devices; optionally, they may be implemented by a program code which is capable of being executed by the computing device, so that they may be stored in a storage device and executed by the computing device. In some situations, the presented or described operations may be executed in an order different from that described here. The presented or described operations may be made into integrated circuit modules, respectively; or multiple modules and operations of them may be made into a single integrated circuit module. Therefore, the disclosure is not limited to any particular combination of hardware and software.

The above is only the exemplary embodiments of the disclosure and not intended to limit the disclosure. For those skilled in the art, the disclosure may have various modifications and changes. Any modifications, equivalent replacements, improvements and the like within the principle of the disclosure should fall within the protection scope of the claims of the disclosure.

What is claimed is:

1. A signal sending method, comprising:
sending a first signal, wherein a sequence of the first signal is generated at least based on a first sequence and a second sequence, and the first sequence and the second sequence are determined in one of the following manners:
a first manner of determining the first sequence at least according to start time domain location information of the first signal and current time domain location information of the first signal, and determining the second sequence at least according to a cell index corresponding to the first signal;
a second manner of determining the first sequence at least according to the start time domain location information of the first signal, and determining the second sequence at least according to the cell index corresponding to the first signal and the current time domain location information of the first signal;
a third manner of determining the first sequence at least according to the start time domain location information of the first signal, the current time domain location information of the first signal, and the cell index corresponding to the first signal, and determining the second sequence at least according to the cell index corresponding to the first signal;
a fourth manner of determining the first sequence at least according to the start time domain location information of the first signal and the cell index corresponding to the first signal, and determining the second sequence at least according to the cell index corresponding to the first signal and the current time domain location information of the first signal; and
a fifth manner of determining the first sequence and the second sequence at least according to the cell index corresponding to the first signal.

2. The signal sending method as claimed in claim 1, wherein the first sequence is a pseudo-random sequence, and the second sequence is a Zadoff-Chu (ZC) sequence; or, the first sequence is a Hadamard sequence, and the second sequence is a ZC sequence.

3. The signal sending method as claimed in claim 2, wherein in a case where the first sequence is the pseudo-random sequence and the second sequence is the ZC sequence, an initial value of the pseudo-random sequence is determined in the manner of determining the first sequence, and at least one of a root sequence index and a cyclic shift index corresponding to the ZC sequence is determined in the manner of determining the second sequence.

4. The signal sending method as claimed in claim 2, wherein in a case where the first sequence is the Hadamard sequence and the second sequence is the ZC sequence, determining the first sequence and the second sequence at least according to the cell index corresponding to the first signal comprises: determining a sequence index of the first sequence and a root sequence index of the second sequence according to the cell index corresponding to the first signal.

5. The signal sending method as claimed in claim 1, wherein the start time domain location information of the first signal comprises at least one of the following:
a start radio frame index, a start subframe index, a start radio frame index of a first channel search space corresponding to the first signal, and a start subframe index of the first channel search space corresponding to the first signal.

6. The signal sending method as claimed in claim 1, wherein the current time domain location information of the first signal comprises at least one of the following:
a current radio frame index, a current subframe index, a first offset value of a current subframe relative to a start subframe of the first signal, a second offset value of a current radio frame relative to a start radio frame of the first signal, a third offset value of the current subframe relative to the start radio frame of the first signal, and a fourth offset value of the current radio frame relative to the start subframe of the first signal.

7. The signal sending method as claimed in claim 1, wherein the first signal comprises at least one of a synchronization signal and a wake-up signal.

8. The signal sending method as claimed in claim 1, wherein
in a case where the first signal is a synchronization signal, the sequence of the first signal is generated further based on a third sequence, wherein the third sequence is an orthogonal sequence with a length F, or the third sequence is generated based on a fourth sequence with a length G, where F is a total number of subframes corresponding to the first signal, and G is a positive integer less than or equal to F.

9. A signal sending apparatus applied to a base station, comprising: a memory and a processor, wherein the memory stores a computer program, and the processor is configured to run the computer program to execute the signal sending method as claimed in claim 1.

10. A non-transitory storage medium, storing a computer program, wherein the computer program is configured to execute, when running, the signal sending method as claimed in claim 1.

11. A signal receiving method, comprising:
receiving a first signal sent by a base station, wherein a sequence of the first signal is generated at least based on a first sequence and a second sequence, and the first sequence and the second sequence are determined in one of the following manners:
a first manner of determining the first sequence at least according to start time domain location information of the first signal and current time domain location information of the first signal, and determining the second sequence at least according to a cell index corresponding to the first signal;
a second manner of determining the first sequence at least according to the start time domain location information of the first signal, and determining the second sequence at least according to the cell index corresponding to the first signal and the current time domain location information of the first signal;

a third manner of determining the first sequence at least according to the start time domain location information of the first signal, the current time domain location information of the first signal, and the cell index corresponding to the first signal, and determining the second sequence at least according to the cell index corresponding to the first signal;
a fourth manner of determining the first sequence at least according to the start time domain location information of the first signal and the cell index corresponding to the first signal, and determining the second sequence at least according to the cell index corresponding to the first signal and the current time domain location information of the first signal; and
a fifth manner of determining the first sequence and the second sequence at least according to the cell index corresponding to the first signal.

12. The signal receiving method as claimed in claim 11, wherein the first sequence is a pseudo-random sequence, and the second sequence is a Zadoff-Chu (ZC) sequence; or, the first sequence is a Hadamard sequence, and the second sequence is a ZC sequence.

13. The signal receiving method as claimed in claim 12, wherein in a case where the first sequence is the pseudo-random sequence and the second sequence is the ZC sequence, an initial value of the pseudo-random sequence is determined in the manner of determining the first sequence, and at least one of a root sequence index and a cyclic shift index corresponding to the ZC sequence is determined in the manner of determining the second sequence.

14. The signal receiving method as claimed in claim 12, wherein in a case where the first sequence is the Hadamard sequence and the second sequence is the ZC sequence, determining the first sequence and the second sequence at least according to the cell index corresponding to the first signal comprises: determining a sequence index of the first sequence and a root sequence index of the second sequence according to the cell index corresponding to the first signal.

15. The signal receiving method as claimed in claim 11, wherein the start time domain location information of the first signal comprises at least one of the following:
a start radio frame index, a start subframe index, a start radio frame index of a first channel search space corresponding to the first signal, and a start subframe index of the first channel search space corresponding to the first signal.

16. The signal receiving method as claimed in claim 11, wherein the current time domain location information of the first signal comprises at least one of the following:
a current radio frame index, a current subframe index, a first offset value of a current subframe relative to a start subframe of the first signal, a second offset value of a current radio frame relative to a start radio frame of the first signal, a third offset value of the current subframe relative to the start radio frame of the first signal, and a fourth offset value of the current radio frame relative to the start subframe of the first signal.

17. The signal receiving method as claimed in claim 11, wherein the first signal comprises at least one of a synchronization signal and a wake-up signal.

18. The signal receiving method as claimed in claim 11, wherein
in a case where the first signal is a synchronization signal, the sequence of the first signal is generated further based on a third sequence, wherein the third sequence is an orthogonal sequence with a length F, or the third sequence is generated based on a fourth sequence with a length G, where F is a total number of subframes corresponding to the first signal, and G is a positive integer less than or equal to F.

19. A signal receiving apparatus applied to User Equipment (UE), comprising: a memory and a processor, wherein the memory stores a computer program, and the processor is configured to run the computer program to execute the signal receiving method as claimed in claim 11.

20. A non-transitory storage medium, storing a computer program, wherein the computer program is configured to execute, when running, the signal receiving method as claimed in claim 11.

* * * * *